(12) United States Patent
Yamakawa et al.

(10) Patent No.: US 11,204,098 B2
(45) Date of Patent: *Dec. 21, 2021

(54) AUTOMATIC TRANSMISSION

(71) Applicant: MAZDA MOTOR CORPORATION, Hiroshima (JP)

(72) Inventors: Shota Yamakawa, Hiroshima (JP); Tomotaka Ishizaka, Hiroshima (JP); Tatsuhiko Iwasaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 81 days.

This patent is subject to a terminal disclaimer.

(21) Appl. No.: 16/719,101

(22) Filed: Dec. 18, 2019

(65) Prior Publication Data

US 2020/0200267 A1 Jun. 25, 2020

(30) Foreign Application Priority Data

Dec. 25, 2018 (JP) .............................. JP2018-241627

(51) Int. Cl.
  *F16H 63/30* (2006.01)
  *F16D 13/38* (2006.01)
  *F16D 7/02* (2006.01)
(52) U.S. Cl.
  CPC ......... *F16H 63/3026* (2013.01); *F16D 7/025* (2013.01); *F16D 13/38* (2013.01); *F16H 2063/3033* (2013.01); *F16H 2200/006* (2013.01)
(58) Field of Classification Search
  CPC ... F16D 57/0484; F16D 57/0473; F16D 57/10
  See application file for complete search history.

(56) References Cited

U.S. PATENT DOCUMENTS 10,774,924 B2 * 9/2020 Yamakawa ............. F16D 55/40
2003/0224899 A1 * 12/2003 Ishimaru ................. F16H 3/666
475/275

(Continued)

FOREIGN PATENT DOCUMENTS

JP   S58206466 A   12/1983
JP   2016090048 A   5/2016
JP   2017150533 A   8/2017

OTHER PUBLICATIONS

European Patent Office, Extended European Search Report Issued in Application No. 19215385.6, dated May 26, 2020, Germany, 7 pages.

(Continued)

*Primary Examiner* — Ernesto A Suarez
*Assistant Examiner* — Lillian T Nguyen
(74) *Attorney, Agent, or Firm* — Alleman Hall Creasman & Tuttle LLP

(57) ABSTRACT

Provided is an automatic transmission with a compact arrangement that prevents rotation of a hub member, and efficiently supplies lubrication hydraulic oil to the friction plates. The automatic transmission comprises a brake in which a plurality of friction plates are arranged between the hub member and a drum member, wherein a biasing member, an engagement hydraulic pressure chamber, and a disengagement hydraulic pressure chamber are arranged radially inward of the friction plates at positions radially overlapping each other. The hub member comprises: a first hub member comprising a cylindrical portion having a splined region with which the friction plates are spline-engaged, wherein the first hub member s spline-engaged with a transmission casing; and a second hub member formed with a part of a lubrication oil supply passage, (Continued)

wherein the second hub member is fittingly engaged with the transmission casing such that it is connected to a valve body.

5 Claims, 15 Drawing Sheets

(56) References Cited

U.S. PATENT DOCUMENTS

| | | |
|---|---|---|
| 2004/0154894 A1 | 8/2004 | Braford, Jr. et al. |
| 2014/0090944 A1* | 4/2014 | Goleski .............. F16H 57/0484 192/3.33 |
| 2016/0281807 A1 | 9/2016 | Kaufman et al. |
| 2017/0009831 A1 | 1/2017 | Iwasaki et al. |
| 2017/0241546 A1 | 8/2017 | Sasahara et al. |
| 2017/0276235 A1 | 9/2017 | Iwasaki et al. |
| 2018/0274600 A1 | 9/2018 | Fukuda et al. |
| 2018/0340605 A1 | 11/2018 | Nishioka et al. |
| 2021/0048103 A1 | 2/2021 | Sasaki et al. |
| 2021/0116025 A1* | 4/2021 | Ishizaka .............. F16H 57/0473 |

OTHER PUBLICATIONS

Japan Patent Office, Office Action Issued in Application No. 2018241627, dated Sep. 7, 2021, 4 pages.

* cited by examiner

FIG. 2

|  | CL1 | CL2 | CL3 | BR1 | BR2 |
|---|---|---|---|---|---|
| 1ST SPEED STAGE | O |  |  | O | O |
| 2ND SPEED STAGE |  | O |  | O | O |
| 3RD SPEED STAGE | O | O |  |  | O |
| 4TH SPEED STAGE |  | O | O |  | O |
| 5TH SPEED STAGE | O |  | O |  | O |
| 6TH SPEED STAGE | O | O | O |  |  |
| 7TH SPEED STAGE | O |  | O | O |  |
| 8TH SPEED STAGE |  | O | O | O |  |
| REVERSE SPEED STAGE |  |  | O | O | O |

← DRIVE SOURCE SIDE          DRIVEN SOURCE SIDE →

← DRIVE SOURCE SIDE    DRIVEN SOURCE SIDE →

DRIVE SOURCE SIDE ← → DRIVEN SOURCE SIDE

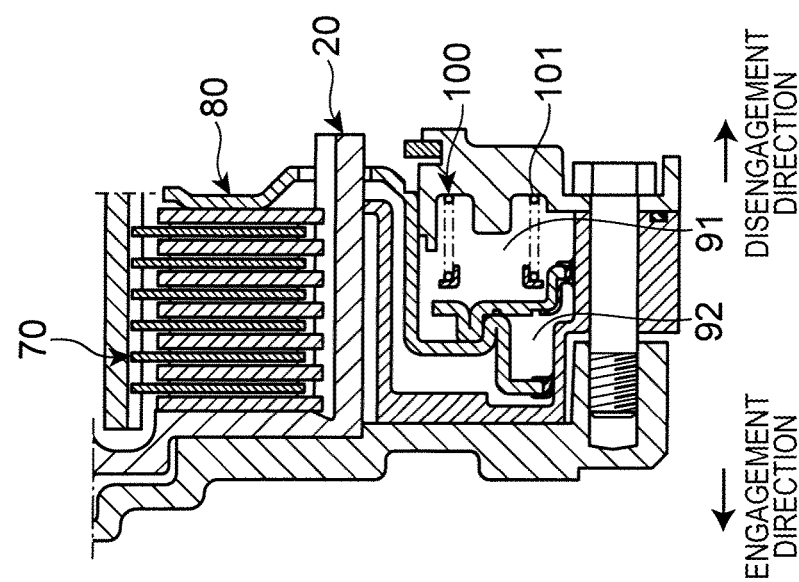
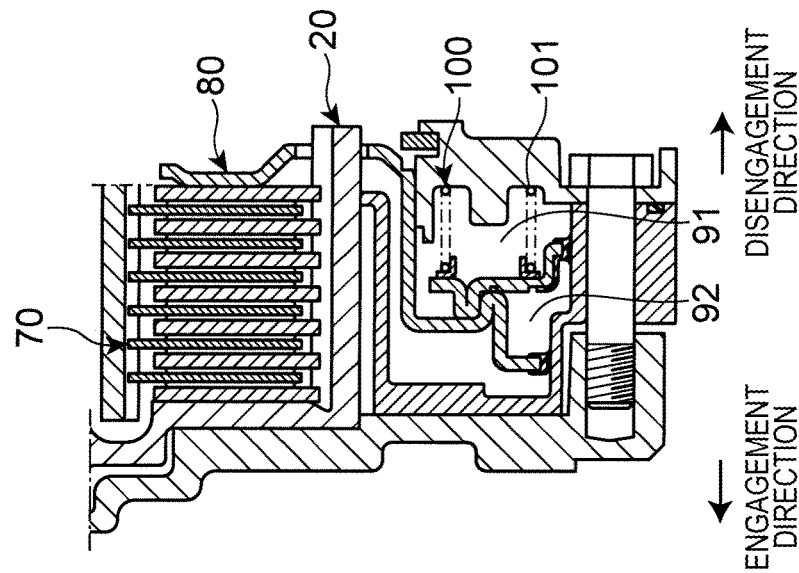
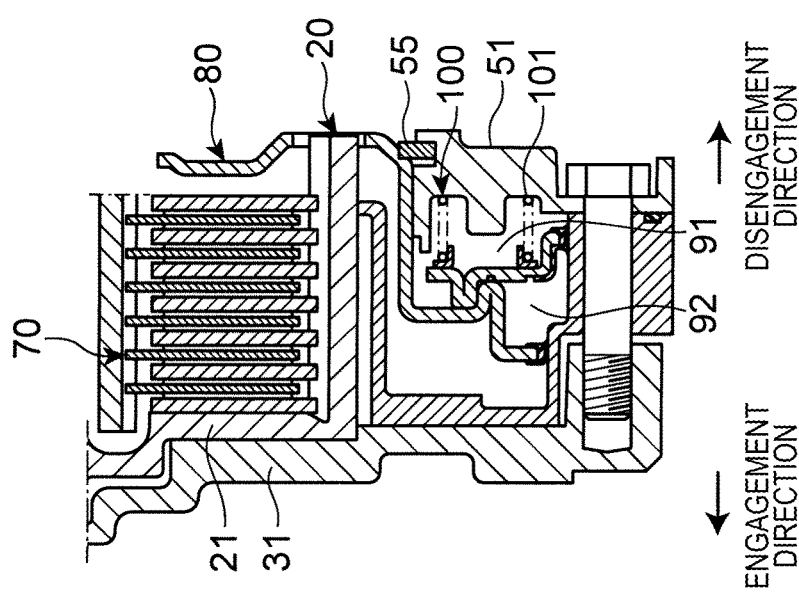

CONVENTIONAL ART

AUTOMATIC TRANSMISSION

TECHNICAL FIELD

The present invention relates to an automatic transmission to be mounted on a vehicle, and belongs to the technical field of vehicle automatic transmissions.

BACKGROUND ART

A commonly known type of automatic transmission to be mounted on a vehicle comprises: a fluid power transmission device such as a torque convertor, which is coupled to a drive source such as an internal combustion engine; and a speed change mechanism coupled to the fluid power transmission device and equipped with a plurality of planetary gearsets (planetary gear mechanisms) and a plurality of frictional engagement elements such as clutches and brakes, wherein the automatic transmission is configured to selectively engage the plurality of frictional engagement elements by hydraulic control, thereby achieving a plurality of speed stages which are different in terms of a speed reduction ratio.

In recent years, responding to demands for a larger number of speed stages and a reduction in weight of an automatic transmission, there has been a tendency toward eliminating the fluid power transmission device. In this case, it is conceivable to subject to slip control, at least one of the frictional engagement elements to be engaged at a first speed stage during start of the vehicle, thereby realizing a smooth start of the vehicle, while avoiding an engine stall.

Here, a brake whose hydraulic pressure chamber is not rotated has better controllability during engagement, as compared with a clutch whose hydraulic pressure chamber is rotated. Thus, in the case where the at least one frictional engagement element to be engaged at the first speed stage during start of the vehicle is subjected to slip control, it is conceivable to subject to slip control, a brake to be engaged at the first speed stage during start of the vehicle.

With regard to the brake to be engaged at the first speed stage during start of the vehicle in the automatic transmission configured as above, there has been known a configuration in which a piston for engaging a plurality of friction plates is biased by a spring and an engagement hydraulic pressure such that it is moved in an engagement direction.

For example, the following Patent Document 1 discloses a brake configured such that a piston is biased by a spring such that it is moved from a disengagement position to a zero-clearance position where a plurality of friction plates are placed in a zero-clearance state, and then biased by an engagement hydraulic pressure such that it is moved from the zero-clearance position to an engagement position.

FIG. 16 is a sectional diagram showing a brake of a conventional automatic transmission. As shown in FIG. 16, a brake 200 comprises: a plurality of friction plates 203 arranged between a hub member 201 and a drum member 202; and a piston 206 fitted in a cylinder 205 defined by an outer cylinder portion 204a, a flange portion 204b, and an inner cylinder portion 204c of a housing 204 as a part of a transmission casing.

Further, the brake 200 has an engagement hydraulic pressure chamber 207 to which engagement hydraulic oil for biasing the piston 206 in an engagement direction is supplied, and a disengagement hydraulic pressure chamber 208 to which disengagement hydraulic oil for biasing the piston 206 in a disengagement direction is supplied. Within the engagement hydraulic pressure chamber 207, a spring 210 is disposed to bias the piston 206 in the engagement direction.

When engaging the brake 200, a disengagement hydraulic pressure is released from a state in which the piston 206 is at a disengagement position where an engagement hydraulic pressure is released from the engagement hydraulic pressure chamber 207, and a disengagement hydraulic pressure is supplied to the disengagement hydraulic pressure chamber 208, so as to cause the piston 206 to compress the spring 210. As a result, the piston 206 is biased by the spring 210 such that it is moved from the disengagement position to a zero-clearance position where the friction plates 203 are placed in a zero-clearance state. After that, upon supply of the engagement hydraulic pressure, the piston 206 is biased by the engagement hydraulic pressure such that it is moved to an engagement position where the friction plates 203 are engaged together.

On the other hand, when disengaging the brake 200, the engagement hydraulic pressure is released, and the disengagement hydraulic pressure is supplied, from a state in which the piston 206 is at the engagement position. As a result, the piston 206 is biased in the disengagement direction such that it is moved to the disengagement position where the piston 206 compresses the spring 210.

In the brake 200, as compared with a case where only a hydraulic pressure is used to move the piston 206 from the disengagement position to the zero-clearance position, it becomes possible to accurately move the piston 206 from the disengagement position to the zero-clearance position by additionally using the spring 210.

CITATION LIST

Patent Document

[Patent Document 1] JP 2017-150533A

SUMMARY OF INVENTION

Technical Problem

In an automatic transmission comprising the brake described in the Patent Document 1, it is possible to accurately move the piston from the disengagement position to the zero-clearance position by additionally using a biasing member such as the spring 210. However, the biasing member, the engagement hydraulic pressure chamber and the disengagement hydraulic pressure chamber are disposed on a driven source side with respect to the piston, so that this arrangement requires a large axial dimension. Thus, it is desired to arrange them in a compact manner.

Further, in the brake described in the Patent Document 1, in which the drum member is joined to a transmission casing and the hub member is joined to a given rotary member, there is a possibility that lubrication hydraulic oil stagnates in the vicinity of an inner peripheral surface of the drum member, leading to an increase in rotational resistance. As a measure against this, it is conceivable that the drum member and the hub member are joined, respectively, to the given rotary member and the transmission casing, thereby suppressing stagnation of the lubrication hydraulic oil by rotation of the drum member.

Further, in an automatic transmission comprising the brake configured such that the hub member is joined to the transmission casing, and the drum member is joined to the given rotary member, it is conceivable that, in order to improve cooling efficiency of the friction plates, a lubrication oil supply passage is formed in the hub member to supply the lubrication hydraulic oil from the side of the hub member. In this case, however, how to join, to the transmission casing, the hub member with which the friction plates are spline-engaged and which is formed with the lubrication oil supply passage becomes a problem.

The hub member having a splined region with which the friction plates are spline-engaged needs to be joined to the transmission casing so as to prevent rotation of the friction plates while receiving a force input from the friction plates during engagement of the brake. Thus, it is conceivable to spline-engage the hub member with the transmission casing.

However, in the case where the hub member and the transmission casing are spline-engaged together, backlash occurs in a joined portion between the hub member and the transmission casing and also in a connected portion between the hub member and a valve body disposed beneath the transmission casing, in a circumferential direction of the transmission casing. This is likely to cause difficulty in efficiently supplying lubrication hydraulic oil from the valve body to the friction plates.

As a measure against this, it is conceivable to press-fit the hub member with which the friction plates are spline-engaged, to the transmission casing so as to allow the lubrication hydraulic oil to be effectively supplied from the valve body to the friction plates. In this case, however, there is a possibility of failing to prevent rotation of the friction plates while receiving a force input from the friction plates during engagement of the brake.

In order to solve the above problems, it is an object of the present invention to provide an automatic transmission equipped with a brake which comprises a plurality of friction plates arranged between a hub member and a drum member, a biasing member biasing a piston, an engagement hydraulic pressure chamber, and a disengagement hydraulic pressure chamber, wherein the automatic transmission is capable of realizing a compact arrangement while preventing rotation of the hub member with which the friction plates are spline-engaged, and efficiently supplying lubrication hydraulic oil from a valve body to the friction plates.

Solution to Technical Problem

In order to achieve the above object, the present invention provides an automatic transmission which is equipped with a brake comprising: a hub member joined to a transmission casing; a drum member joined to a given rotary member; a plurality of friction plates arranged between the hub member and the drum member; a piston for engaging the plurality of friction plates; a biasing member biasing the piston in an engagement direction; an engagement hydraulic pressure chamber to which hydraulic oil for biasing the piston in the engagement direction is supplied; and a disengagement hydraulic pressure chamber to which hydraulic oil for biasing the piston in a disengagement direction is supplied, wherein the biasing member, the engagement hydraulic pressure chamber, and the disengagement hydraulic pressure chamber are arranged radially inward of the plurality of friction plates at positions radially overlapping each other, and wherein the hub member comprises: a first hub member comprising a cylindrical portion having a splined region with which the friction plates are spline-engaged, wherein the first hub member is spline-engaged with the transmission casing; and a second hub member disposed on one side in an axial direction with respect to the first hub member, and formed with a first part of a lubrication oil supply passage for supplying lubrication hydraulic oil to the friction plates, wherein the second hub member is fittingly engaged with the transmission casing such that it is connected to a valve body disposed beneath the transmission casing.

According to the above feature of the present invention, in the automatic transmission equipped with the brake in which the plurality of friction plates are arranged between the hub member and the drum member, the biasing member biasing the piston, the engagement hydraulic pressure chamber, and the disengagement hydraulic pressure chamber are arranged radially inward of the plurality of friction plates at positions radially overlapping each other, This makes it possible to, as compared with a case where the biasing member, the engagement hydraulic pressure chamber, and the disengagement hydraulic pressure chamber are arranged on one side in the axial direction with respect to the plurality of friction plates, arrange them in an axially compact manner, and as compared with a case where the biasing member, the engagement hydraulic pressure chamber, and the disengagement hydraulic pressure chamber are arranged without radially overlapping each other, arrange them in a radially compact manner.

Further, the hub member comprises: the first hub member comprising the cylindrical portion having the splined region with which the friction plates are spline-engaged, wherein the first hub member is spline-engaged with the transmission casing; and the second hub member formed with a part of the lubrication oil supply passage, wherein the second hub member is fittingly engaged with the transmission casing such that it is connected to the valve body.

In this way, the first hub member is spline-engaged with the transmission casing, so that it is possible to suppress a situation where, during engagement of the brake, the first hub member is rotated in a circumferential direction of the transmission casing by a force input from the friction plates through the splined region, i.e., to prevent rotation of the hub member.

The second hub member is fittingly engaged with the transmission casing, so that it is possible to fix the second hub member to the transmission casing, and allow a connected portion between the second hub member and the valve body to become free of backlash in the circumferential direction of the transmission casing, thereby efficiently supplying the lubrication hydraulic oil from the valve body to a part of the lubrication oil supply passage of the second hub member.

Therefore, in the automatic transmission equipped with the brake which comprises the plurality of friction plates arranged between the hub member and the drum member, the biasing member biasing the piston, the engagement hydraulic pressure chamber, and the disengagement hydraulic pressure chamber, it becomes possible to realize a compact arrangement while preventing rotation of the hub member with which the friction plates are spline-engaged, and efficiently supplying the lubrication hydraulic oil from the valve body to the friction plates.

Preferably, in the automatic transmission of the present invention, the hub member further comprises a third hub member disposed radially inward of the first hub member and joined to a portion of the second hub member on the other side in the axial direction, wherein the third hub member has a cylindrical portion provided radially inward of the cylindrical portion of the first hub member to form a part of the lubrication oil supply passage in cooperation with the cylindrical portion of the first hub member, wherein the cylindrical portion of the first hub member is provided with a supply port for supplying the lubrication hydraulic oil to the friction plates.

According to this feature, the hub member comprises the third hub member disposed radially inward of the first hub member and joined to the second hub member, wherein the third hub member has the cylindrical portion forming a part of the lubrication oil supply passage in cooperation with the cylindrical portion of the first hub member, wherein the cylindrical portion of the first hub member is provided with the supply port.

Therefore, the lubrication hydraulic oil can be supplied to the friction plates via a part of the lubrication oil supply passage of the second hub member and a part of the lubrication oil supply passage formed between the cylindrical portion of the first hub member and the cylindrical portion of the third hub member and through the supply port of the cylindrical portion of the first hub member, so that it is possible to efficiently supply the lubrication hydraulic oil to the friction plates.

More preferably, in the above automatic transmission, the first hub member, the second hub member, and the third hub member are formed from a same material.

According to this feature, the first to third hub members are formed from the same material, so that it is possible to approximately equalize a change in dimension of each of the first to third hub members due to thermal expansion, as compared with a case where the first to third hub members are not formed from the same material, thereby efficiently supplying the lubrication hydraulic oil to the friction plates.

Preferably, in the automatic transmission of the present invention, the biasing member is configured to apply a biasing force to the piston in the engagement direction in a range from a disengagement position to a zero-clearance position.

According to this feature, the biasing member is configured to apply a biasing force to the piston in the engagement direction in a range from the disengagement position to the zero-clearance position, so that it is possible to accurately move, by the biasing member, the piston from the disengagement position to the zero-clearance position.

Preferably, in the automatic transmission of the present invention, the piston comprises: a first piston member having a pressing portion for pressing the friction plates, a hydraulic pressure chamber forming portion forming the engagement hydraulic pressure chamber and the disengagement hydraulic pressure chamber, and a connecting portion connecting the pressing portion and the hydraulic pressure chamber forming portion; and a second piston member joined to the first piston member to partition between the engagement hydraulic pressure chamber and the disengagement hydraulic pressure chamber.

According to this feature, the piston comprises: the first piston member having the pressing portion, the hydraulic pressure chamber forming portion and the connecting portion; and the second piston member joined to the first piston member to partition between the engagement hydraulic pressure chamber and the disengagement hydraulic pressure chamber. Thus, even in a situation where it is difficult to form, by a single member, a piston having the pressing portion, the hydraulic pressure chamber forming portion and the connecting portion and partitioning between the engagement hydraulic pressure chamber and the disengagement hydraulic pressure chamber, such a piston having the pressing portion, the hydraulic pressure chamber forming portion and the connecting portion and partitioning between the engagement hydraulic pressure chamber and the disengagement hydraulic pressure chamber can be relatively easily formed by joining the first piston member and the second piston member together.

Effect of Invention

The present invention can provide an automatic transmission equipped with a brake which comprises a plurality of friction plates arranged between a hub member and a drum member, a biasing member biasing a piston, an engagement hydraulic pressure chamber, and a disengagement hydraulic pressure chamber, wherein the automatic transmission is capable of realizing a compact arrangement while preventing rotation of the hub member with which the friction plates are spline-engaged, and efficiently supplying lubrication hydraulic oil from a valve body to the friction plates.

BRIEF DESCRIPTION OF DRAWINGS

FIG. 2 is a table showing an engagement state of frictional engagement elements of the automatic transmission according to this embodiment.

FIG. 15A is a sectional view showing the brake in this embodiment in a disengaged state, in a zero-clearance state, and in an engaged state.

FIG. 15B is a sectional view showing the brake in this embodiment in a disengaged state, in a zero-clearance state, and in an engaged state.

FIG. 15C is a sectional view showing the brake in this embodiment in a disengaged state, in a zero-clearance state, and in an engaged state.

DESCRIPTION OF EMBODIMENTS

With reference to the accompanying drawings, an embodiment of the present invention will now be described.

Figure 1:
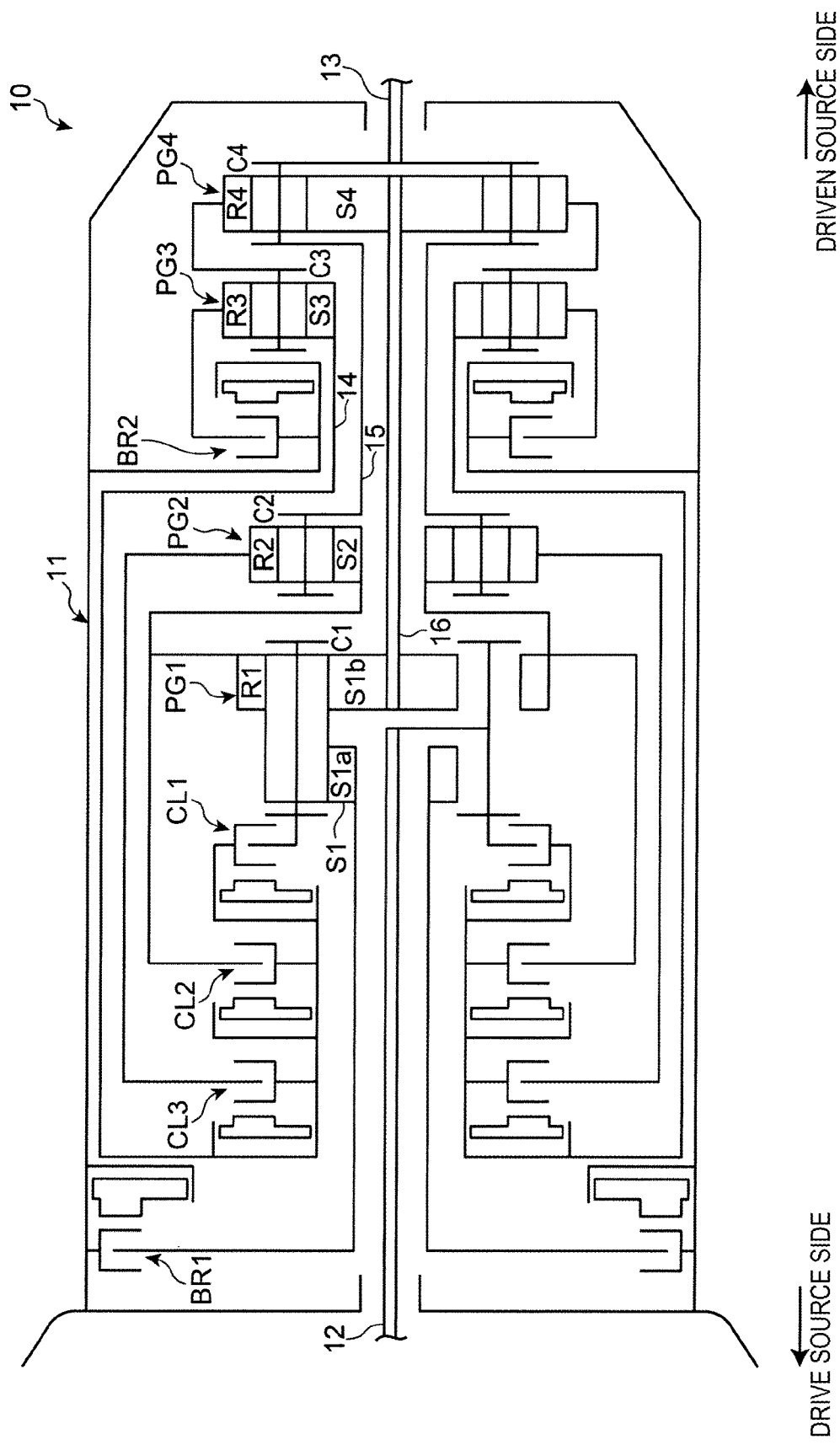
FIG. 1 is a schematic configuration diagram of an automatic transmission according to one embodiment of the present invention.

FIG. 1 is a schematic configuration diagram of an automatic transmission according to one embodiment of the present invention. An automatic transmission 10 is coupled to a drive source such as an internal combustion engine without intervention of a fluid power transmission device such as a torque converter. The automatic transmission 10 has, within a transmission casing 11, an input shaft 12 coupled to the drive source and disposed on a drive source side (on the left side in FIG. 1), and an output shaft 13 disposed on a driven source side (on the right side in FIG. 1). The automatic transmission 10 is a longitudinal-mounted automatic transmission for front-engine, rear-wheel drive vehicles or the like, in which the input shaft 12 and the output shaft 13 are arranged on the same axis.

On the axis of the input shaft 12 and the output shaft 13, first, second, third, and fourth planetary gearsets (hereinafter referred to simply as "first, second, third, and fourth gearsets") PG1, PG2, PG3, PG4 are arranged in this order from the drive source side.

Within the transmission casing 11, a first clutch CL1 is disposed on the drive source side with respect to the first gearset PG1, and a second clutch CL2 and a third clutch CL3 are disposed, respectively, on the drive source side with respect to the first clutch CL1 and on the drive source side with respect to the second clutch CL2. Further, a first brake BR1 is disposed on the drive source side with respect to the third clutch CL3, and a second brake BR2 is disposed on the drive source side with respect to the third gearset PG3 and on the driven source side with respect to the second gearset PG2.

Each of the first, second, third, and fourth gearsets PG1, PG2, PG3, PG4 is a single pinion-type planetary gearset in which a pinion supported by a carrier is directly meshed with a sun gear and a ring gear. Each of the first, second, third, and fourth gearsets PG1, PG2, PG3, PG4 comprises, as rotational elements, a sun gear (S1, S2, S3, S4), a ring gear (R1, R2, R3, R4) and a carrier (C1, C2, C3, C4)

The first gearset PG1 is a double sun gear-type planetary gearset in which the sun gear S1 is divided into two in an axial direction of the transmission casing 11. Specifically, the sun gear S1 comprises a first sun gear S1a disposed on the drive source side, and a second sun gear S1b disposed on the driven source side. Each of the first sun gear S1a and the second sun gear S1b has the same number of teeth, and the first and second sun gears S1a, S1b are meshed with the same pinion supported by the carrier C1. Thus, the first and second sun gears S1a, S1b are always rotated in the same manner.

In the automatic transmission 10, the sun gear S1, specifically the second sun gear S1b, of the first gearset PG1 is always coupled to the sun gear S4 of the fourth gearset PG4, and the ring gear R1 of the first gearset PG1 is always coupled to the sun gear S2 of the second gearset PG2. Further, the carrier C2 of the second gearset PG2 is always coupled to the carrier C4 of the fourth gearset PG4, and the carrier C3 of the third gearset PG3 is always coupled to the ring gear R4 of the fourth gearset PG4.

The input shaft 12 is always coupled to the carrier C1 of the first gearset PG1 via the first sun gear S1a and the second sun gear S1b.

The first clutch CL1 is disposed between a set of the input shaft 12 and the carrier C1 of the first gearset PG1, and the sun gear S3 of the third gearset PG3, and configured to selectively engage and disengage therebetween. The second clutch CL2 is disposed between each of the ring gear R1 of the first gearset PG1 and the sun gear S2 of the second gearset PG2, and the sun gear S3 of the third gearset PG3, and configured to selectively engage and disengage therebetween. The third clutch CL3 is disposed between the ring gear R2 of the second gearset PG2, and the sun gear S3 of the third gearset PG3, and configured to selectively engage and disengage therebetween.

The first brake BR1 is disposed between the transmission casing 11, and the sun gear S1, specifically the first sun gear S1a, of the first gearset PG1, and configured to selectively engage and disengage therebetween. The second brake BR2 is disposed between the transmission casing 11, and the ring gear R3 of the third gearset PG3, and configured to selectively engage and disengage therebetween.

The automatic transmission 10 is configured such that first to eighth speed stages in a drive (D) range and a reverse speed stage in a reverse (R) range are achieved by combinations of any three of the first clutch CL1, the second clutch CL2, the third clutch CL3, the first brake BR1, and the second brake BR2 in an engaged state, as shown in FIG. 2.

In the automatic transmission 10, during starting of a vehicle, the second brake BR2 to be engaged in the first speed stage is slip-controlled. Thus, the second brake BR2 is equivalent to a frictional engagement element of the automatic transmission according to this embodiment.

This brake BR2 will be described below.

Figure 3:
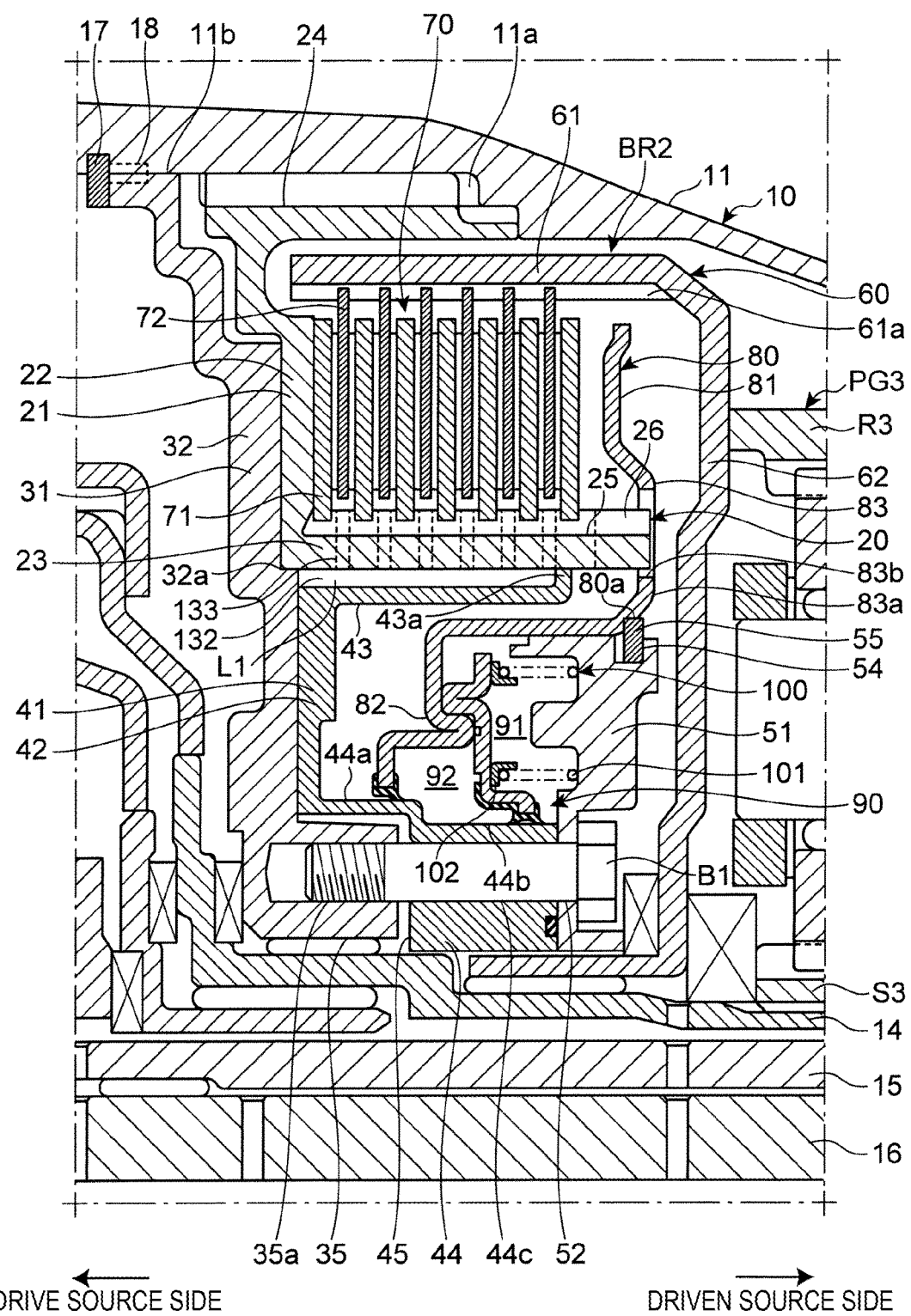
FIG. 3 is a sectional view of a brake of the automatic transmission according to this embodiment and the vicinity thereof.
Figure 4:
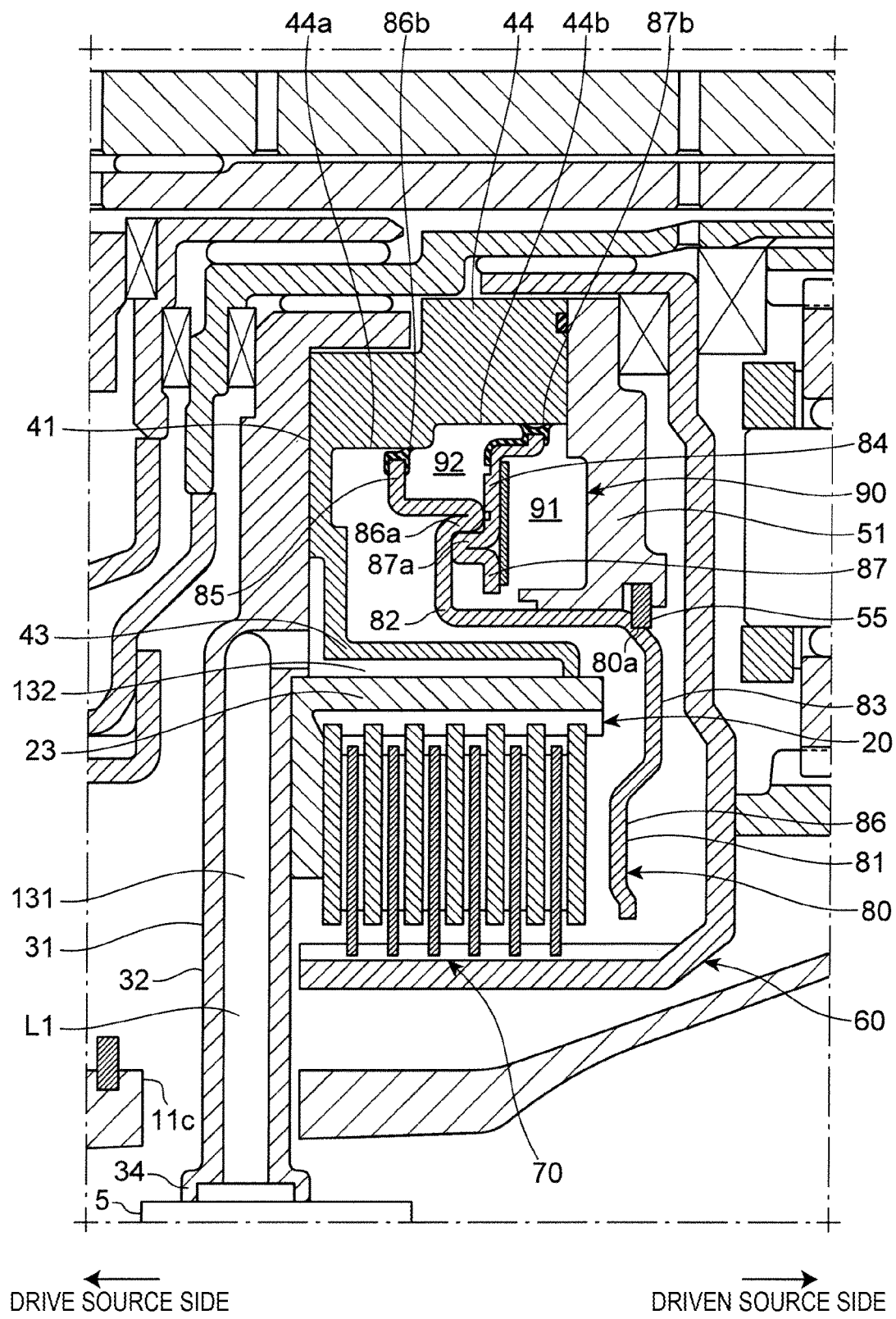
FIG. 4 is another sectional view of the brake of the automatic transmission according to this embodiment and the vicinity thereof.
Figure 5:
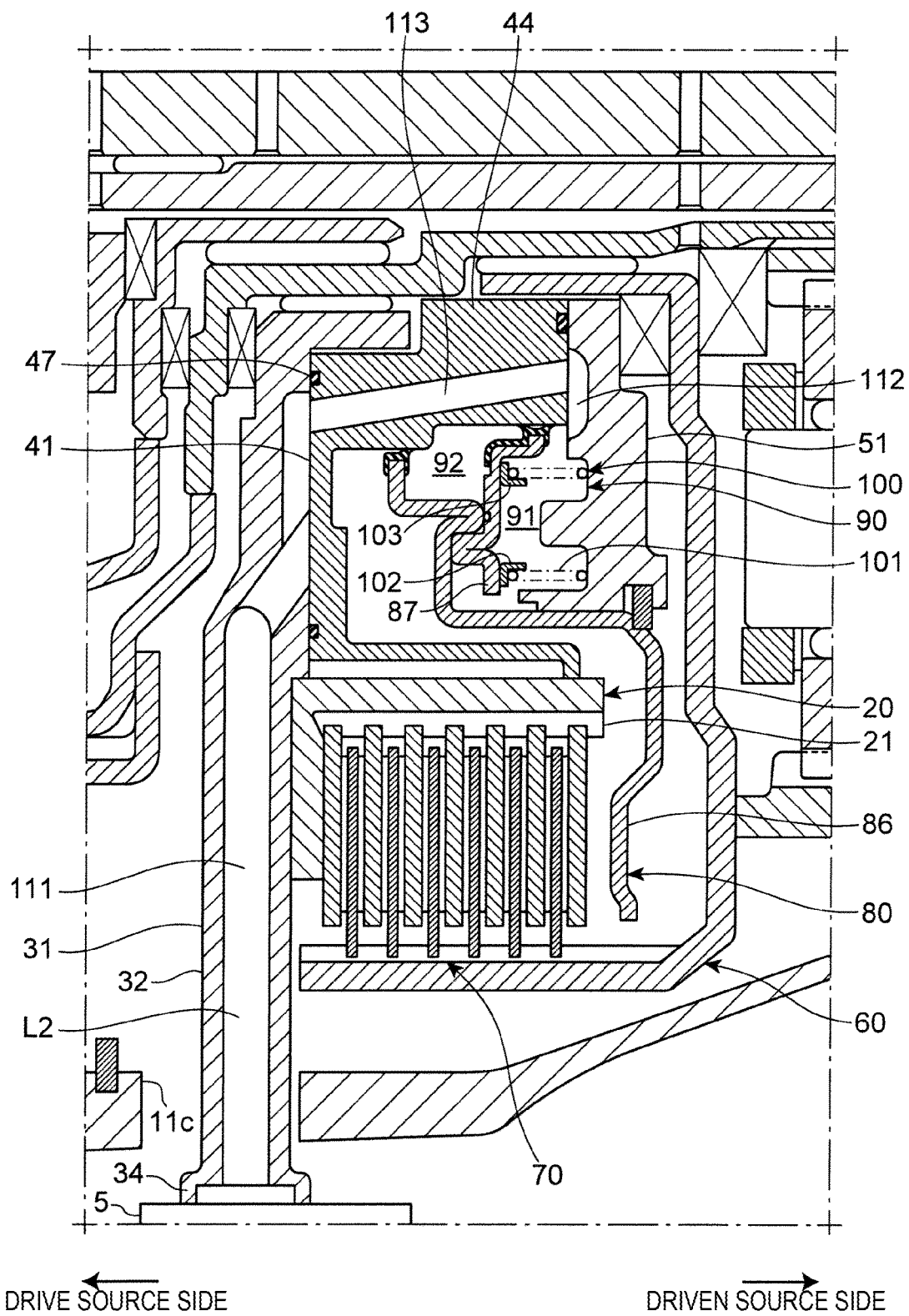
FIG. 5 is yet another sectional view of the brake of the automatic transmission according to this embodiment and the vicinity thereof.
Figure 6:
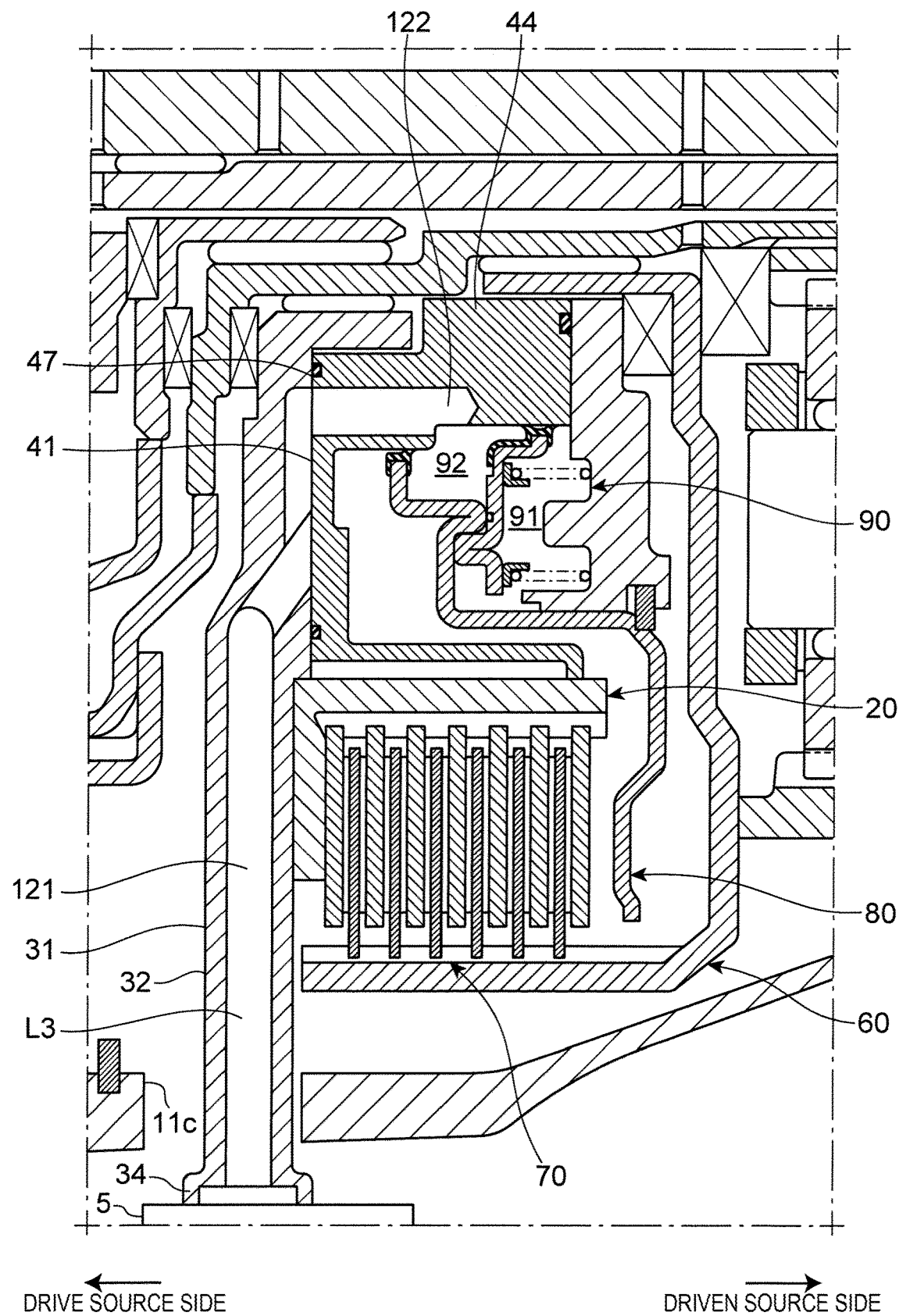
FIG. 6 is still another sectional view of the brake of the automatic transmission according to this embodiment and the vicinity thereof.

FIG. 3 is a sectional view of the brake of the automatic transmission according to this embodiment and the vicinity thereof, and FIG. 4 is another sectional view of the brake of the automatic transmission according to this embodiment and the vicinity thereof. FIGS. 5 and 6 are other sectional views of the brake of the automatic transmission according to this embodiment and the vicinity thereof. Specifically, FIG. 3 is a sectional view of the brake of the automatic transmission and the vicinity thereof, taken along the line Y3-Y3 of FIG. 7, and FIGS. 4, 5, and 6 are sectional views of the brake of the automatic transmission and the vicinity thereof, taken along the line Y4-Y4, the line Y5-Y5, and the line Y6-Y6 of FIG. 12, respectively.

As shown in FIGS. 3 to 6, the brake BR2 is housed in the transmission casing 11 which is formed in an approximately hollow-cylindrical shape. The brake BR2 is disposed on an outer peripheral side of a drive force transmission member 14 which is coupled to the sun gear S3 of the third gearset PG3 and with which one of a pair of inner and outer rotary members of each of the first, second, and third clutches CL1, CL2, CL3 is integrated.

The drive force transmission member 14 is disposed on an outer peripheral side of a drive force transmission member 15 which couples the carrier C2 of the second gearset PG2 and the carrier C4 of the fourth gearset PG4 together. The drive force transmission member 15 is disposed on an outer peripheral side of a drive force transmission member 16 which couples the sun gear S1, specifically the second sun gear S1b, of the first gearset PG1 and the sun gear S4 of the fourth gearset PG4.

The brake BR2 comprises: a hub member 20 joined to the transmission casing 11; a drum member 60 disposed on the driven source side with respect to the hub member 20, and joined to the ring gear R3 of the third gearset PG3; a plurality of frictional plates 70 arranged between the hub member 20 and the drum member 60 in axially side-by-side relation; and a piston 80 partly disposed on the driven source side with respect to the friction plates 70 and configured to engage the friction plates 70.

The brake BR2 has a hydraulic pressure chamber 90 which is disposed radially inward of the friction plates 70 and to which hydraulic oil for biasing the piston 80 is supplied. The hydraulic pressure chamber 90 comprises an engagement hydraulic pressure chamber 91 to which engagement hydraulic oil for biasing the piston 80 in an engagement direction is supplied, and a disengagement hydraulic pressure chamber 92 to which disengagement hydraulic oil for biasing the piston 80 in a disengagement direction is supplied.

As shown in FIG. 3, the brake BR2 further comprises a biasing unit 100 disposed radially inward of the friction plates 70 to bias the piston 80. The biasing unit 100 comprises a spring 101 which applies a biasing force to the piston 80 in the engagement direction to serve as a biasing member biasing the piston 80.

Figure 7:
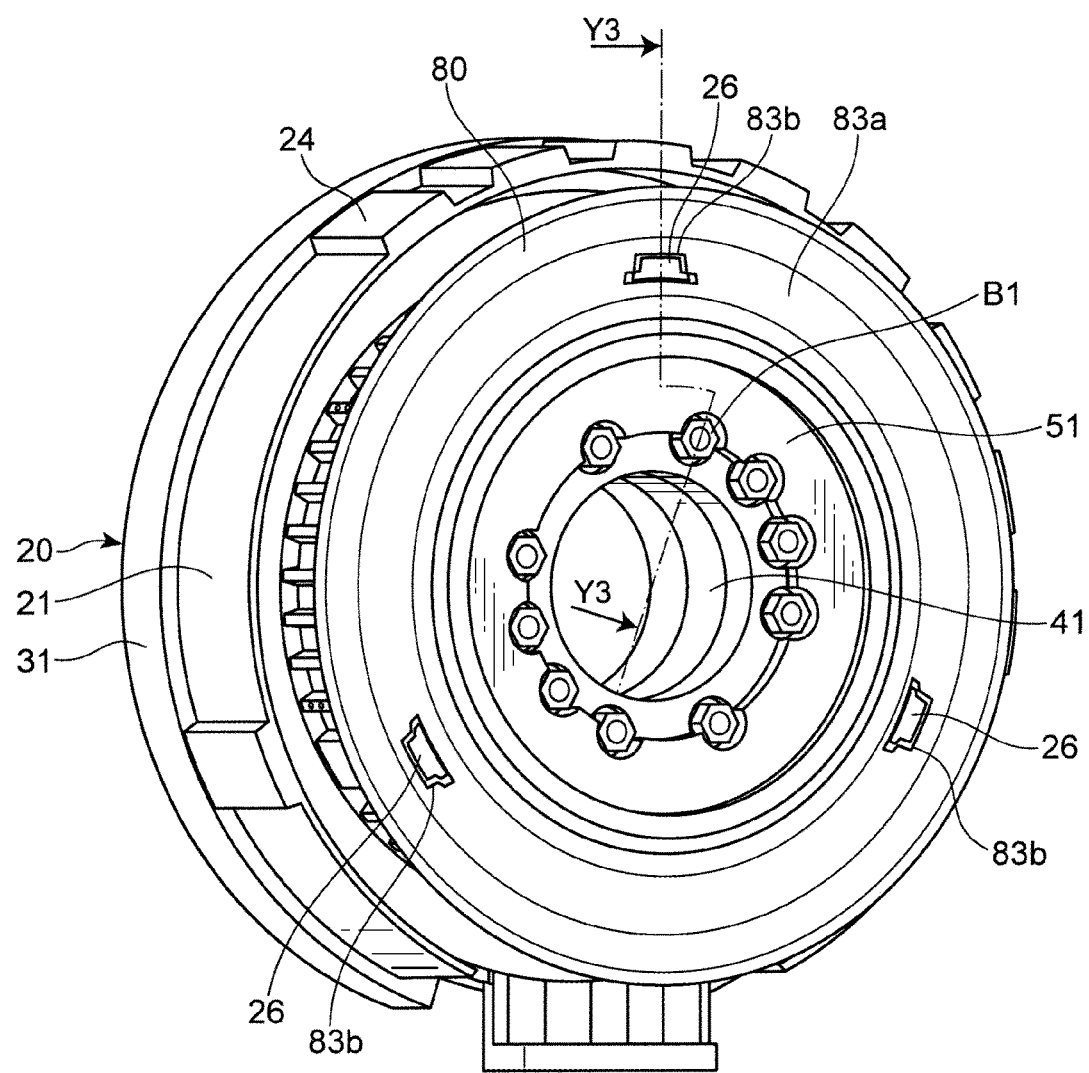
FIG. 7 is a perspective view showing an assembled state of a hub member and a piston of the brake in this embodiment.
Figure 8:
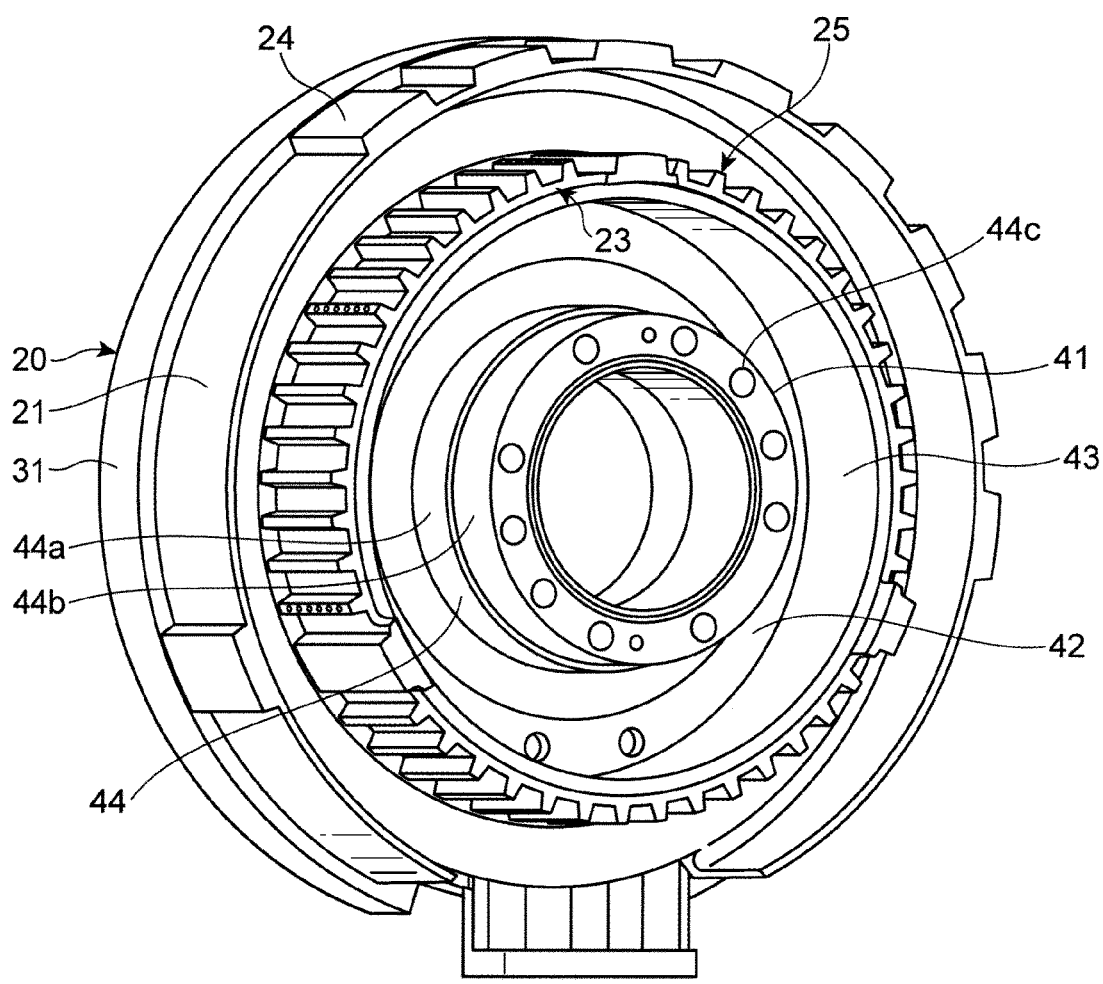
FIG. 8 is a perspective view showing an assembled state of a first hub member, a second hub member, and a third hub member of the brake in this embodiment.
Figure 9:
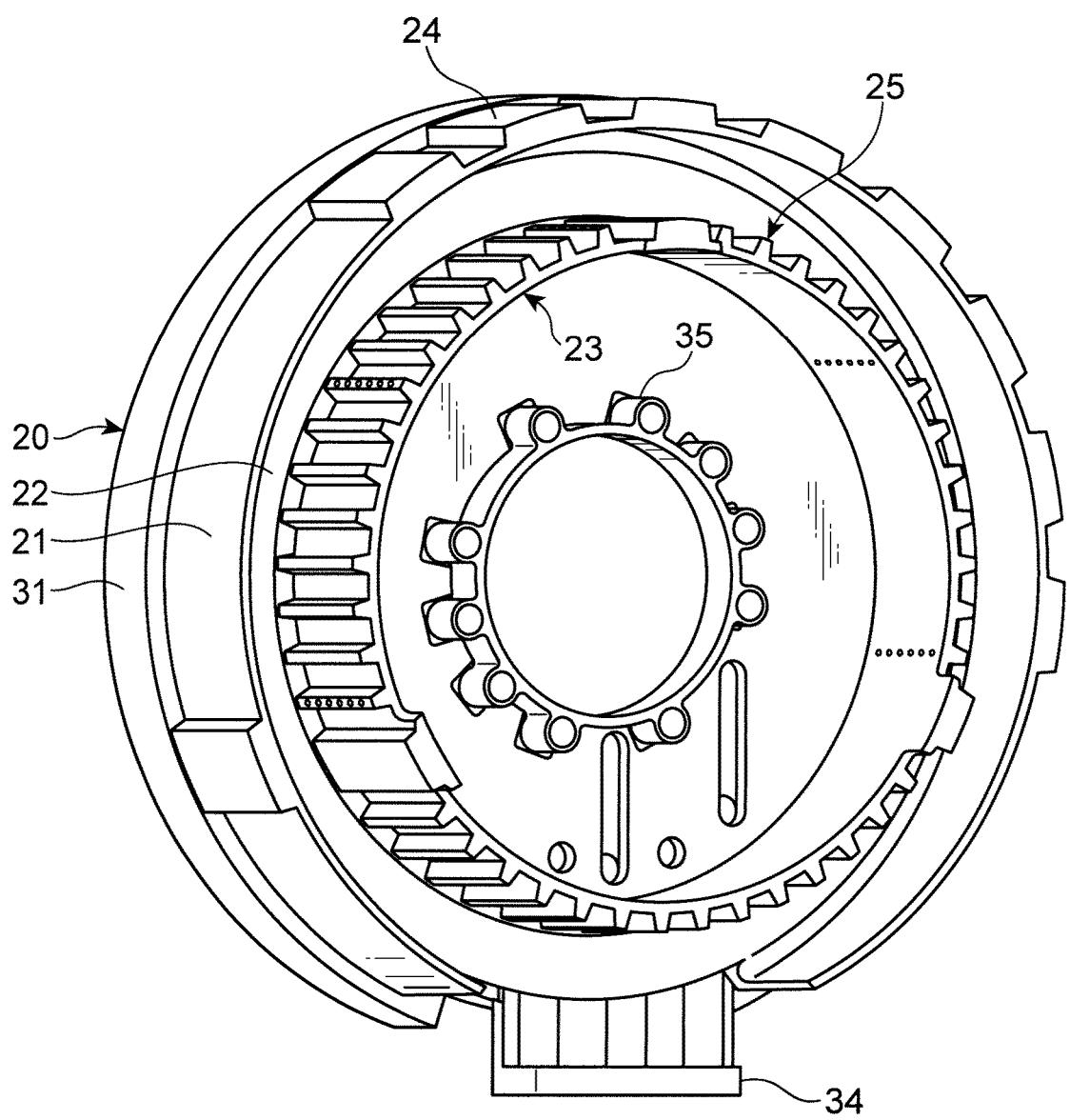
FIG. 9 is a perspective view showing an assembled state of the first hub member and the second hub member of the brake in this embodiment.
Figure 10:
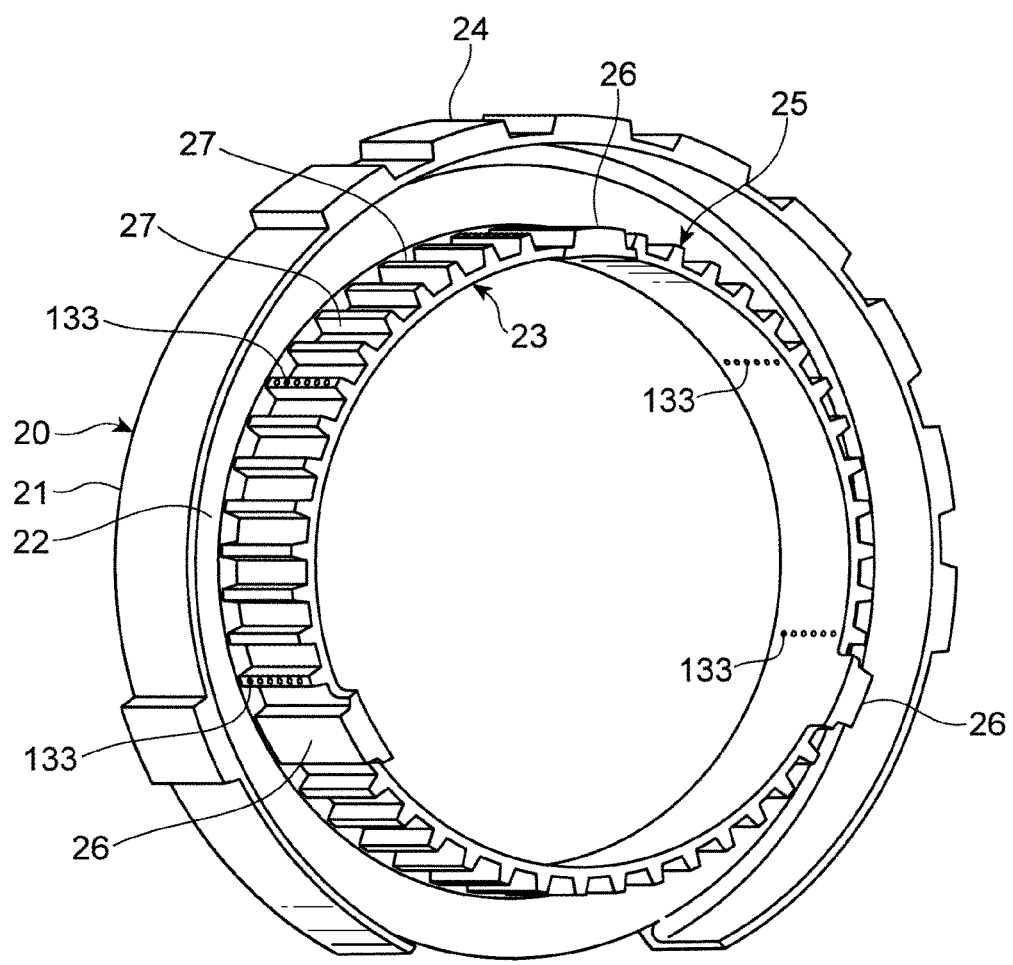
FIG. 10 is a perspective view showing the first hub member in this embodiment.
Figure 11:
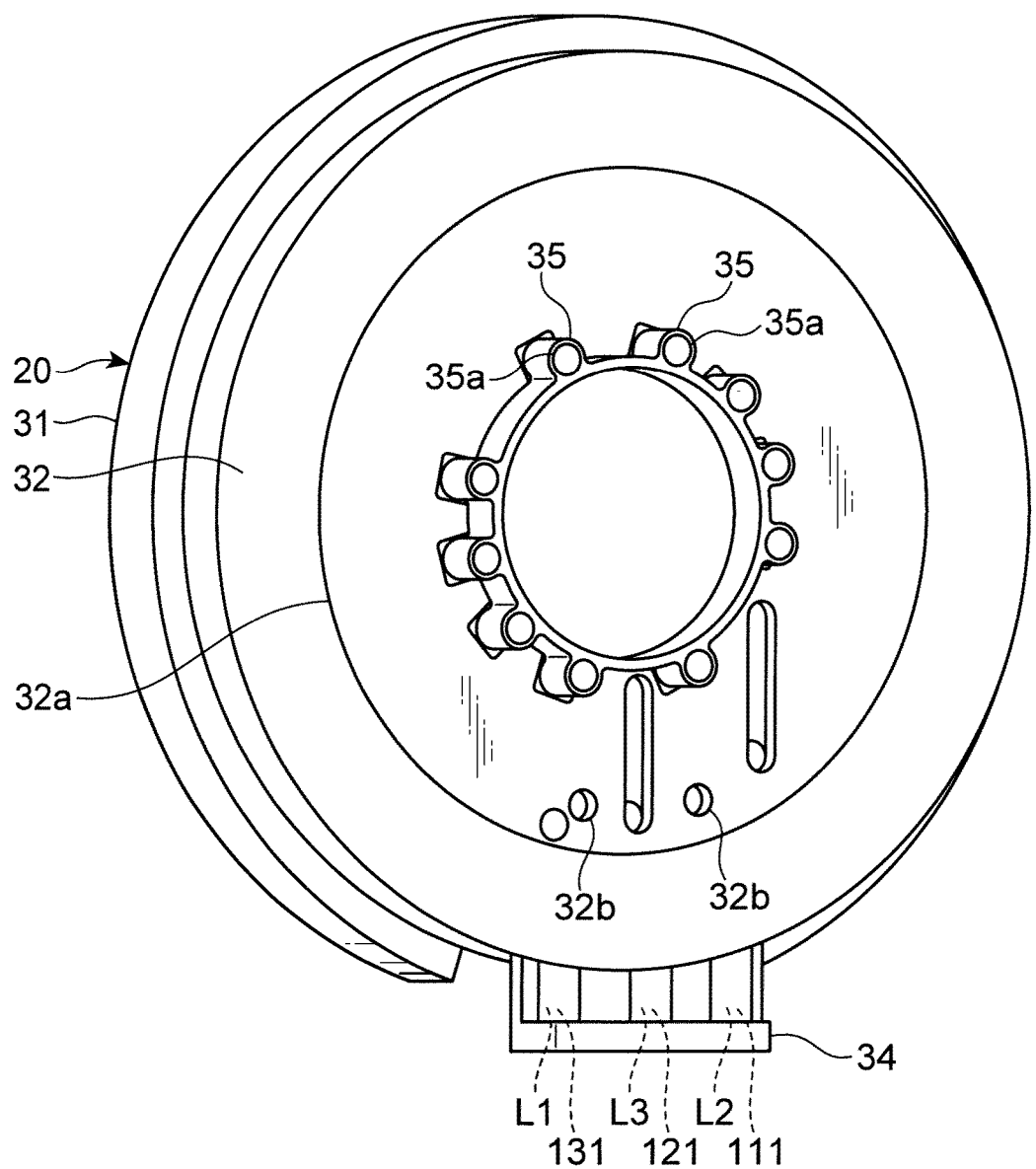
FIG. 11 is a perspective view showing the second hub member in this embodiment.
Figure 12:
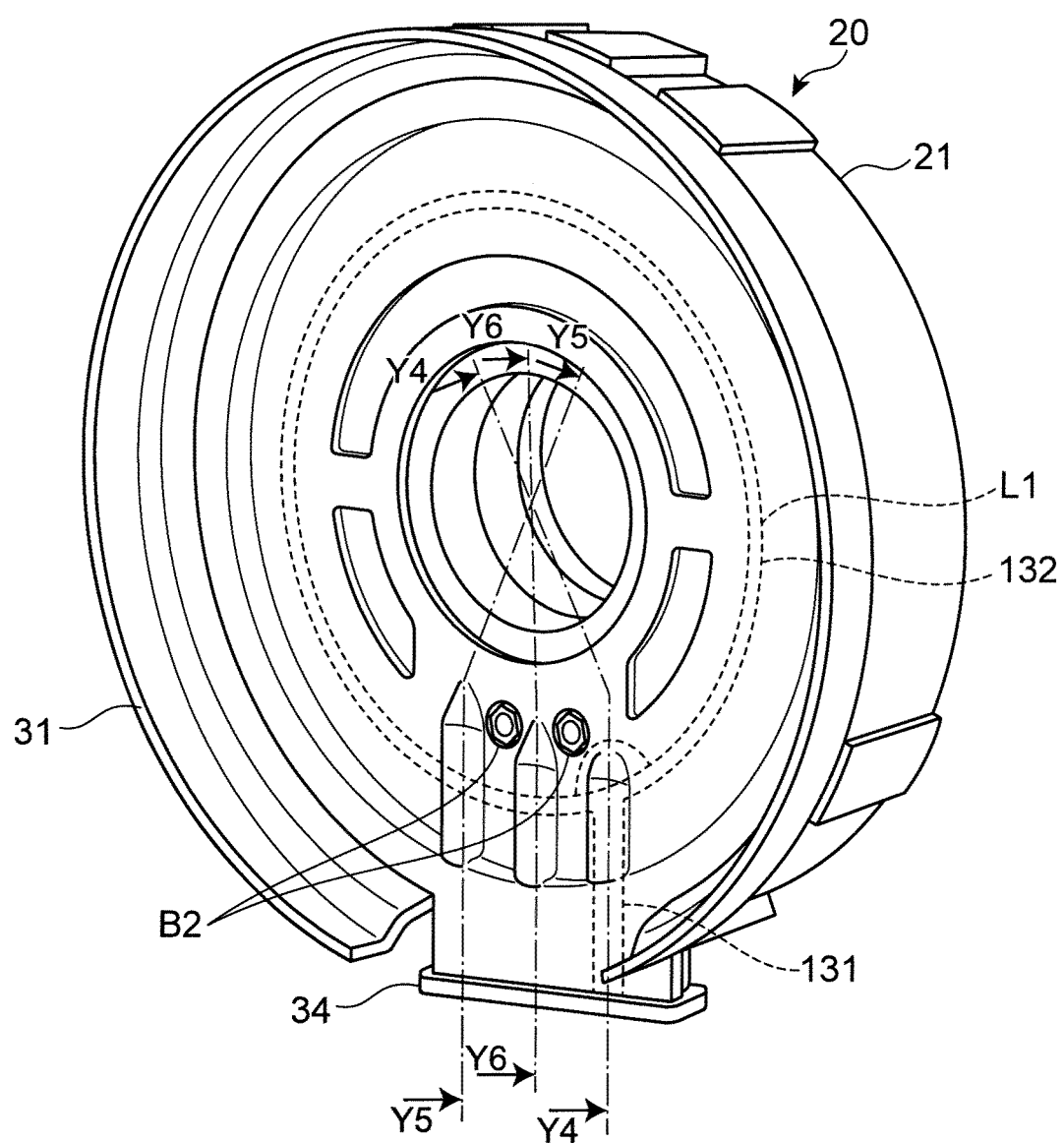
FIG. 12 is another perspective view showing the assembled state of the hub member and the piston of the brake in this embodiment.
Figure 13:
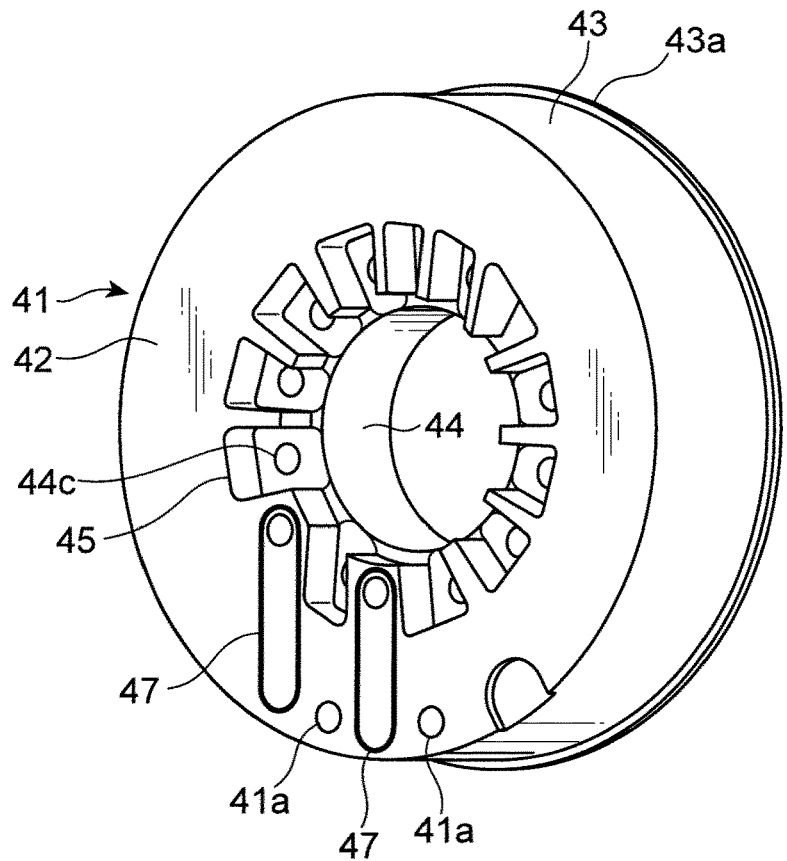
FIG. 13 is a perspective view showing the third hub member in this embodiment.

FIG. 7 is a perspective view showing an assembled state of the hub member and the piston of the brake in this embodiment. FIG. 8 is a perspective view showing an assembled state of a first hub member, a second hub member, and a third hub member of the brake in this embodiment, and FIG. 9 is a perspective view showing an assembled state of the first hub member and the second hub member of the brake in this embodiment. FIG. 10 is a perspective view showing the first hub member in this embodiment, and FIG. 11 is a perspective view showing the second hub member in this embodiment. FIG. 12 is another perspective view showing the assembled state of the hub member and the piston of the brake in this embodiment, and FIG. 13 is a perspective view showing the third hub member in this embodiment.

As shown in FIGS. 3 to 13, the hub member 20 comprises: a first hub member 21 with which the friction plates 70 are spline-engaged and which is spline-engaged with the transmission casing 11; a second hub member 31 disposed on the drive source side with respect to the first hub member 21 and fittingly engaged with the transmission casing 11, wherein the second hub member 31 extends radially inwardly beyond the first hub member 21; a third hub member 41 disposed radially inward of the first hub member 21 and joined to a portion of the second hub member 31 on the driven source side; and a fourth hub member 51 disposed radially inward of the first hub member 21 and joined to an end of the third hub member 41 on the driven source side.

As shown in FIG. 3, the first hub member 21 comprises: a vertical wall portion 22 formed in an approximately annular disc shape extending in a direction orthogonal to the axial direction of the transmission casing 11; and a cylindrical portion 23 formed in an approximately cylindrical shape extending from a radially inward end of the vertical wall portion 22 toward the driven source side.

The first hub member 21 is provided with a splined region 24 having splines formed on an outer peripheral surface of the vertical wall portion 22, and joined to the transmission casing 11 in such a manner that the splined region 24 is spline-engaged with a splined region 11a having splines formed on an inner peripheral surface of the transmission casing 11.

The cylindrical portion 23 of the first hub member 21 is provided with a splined region 25 having splines formed on an outer peripheral surface thereof. Two or more stationary-side friction plates 71 constituting the friction plates 70 are spline-engaged with the splined region 25. As shown in FIG. 10, the splined region 25 has: a first tooth 26 having a given axial length enough to be spline-engaged with the friction plates 70 even in a disengaged state of the friction plates 70; and a second tooth 27 formed to have an axial length less than that of the first tooth 26 and spline-engaged with the friction plates 70. The first tooth 26 is provided plurally, specifically by a number of three, wherein the three first teeth 26 are arranged at approximately even intervals in a circumferential direction of the first hub member 21.

As shown in FIG. 3, the second hub member 31 comprises a vertical wall portion 32 formed in an approximately annular disc shape extending in a direction orthogonal to the axial direction of the transmission casing 11. As shown in FIG. 4, the vertical wall 32 of the second hub member 31 is formed with a part of a lubrication oil supply passage L1 for supplying lubrication hydraulic oil to the friction plates 70.

The second hub member 31 is installed such that an outer peripheral surface of the vertical wall portion 32 is fittingly engaged with an inner peripheral surface 11b of the transmission casing 11 at a position on the drive source side with respect to the splined region 24 of the first hub member 21. The second hub member 31 is joined to the transmission casing 11, while being prevented from dropping out toward the drive source side by using a snap ring 17, and non-rotatably fixed to transmission casing 11 by using an anti-rotation pin 18. Alternatively, the second hub member 31 may be joined to the transmission casing 11 by being press-fittingly fixed to the inner peripheral surface 11b of the transmission casing 11.

As shown in FIG. 4, a valve body 5 is disposed beneath the transmission casing 11 to supply hydraulic oil to the hydraulic pressure chamber 90 of the brake BR2, the friction plates 70, etc. The valve body 5 is housed in an oil pan (not shown) mounted to a lower portion of the transmission casing 11, and fixed to the transmission casing 11. The second hub member 31 has a valve body connection portion 34 for connection with the valve body 5. The valve body connection portion 34 is configured to allow the lubrication oil supply passage L1 to be connected to the valve body 5 through a casing opening 11c formed in the transmission casing 11.

The vertical wall portion 32 of the second hub member 31 is formed with an engagement oil supply passage L2 for supplying engagement hydraulic oil to the engagement hydraulic pressure chamber 91, as shown in FIG. 5, and a disengagement oil supply passage L3 for supplying disengagement hydraulic oil to the disengagement hydraulic pressure chamber 92, as shown in FIG. 6.

As shown in FIG. 11, the lubrication oil supply passage L1, the disengagement oil supply passage L3, and the engagement oil supply passage L2 are arranged in circumferentially side-by-side relation on a lower side of the transmission casing 11. The second hub member 31 is formed to allow the lubrication oil supply passage L1, the disengagement oil supply passage L3, and the engagement oil supply passage L2 to be connected to the valve body 5, individually.

As shown in FIG. 3, the vertical wall portion 32 of the second hub member 31 has a step 32a formed on the driven source side and depressed toward the drive source side. The step 32a of the second hub member 31 is formed such that, when the vertical wall portion 22 of the first hub member 21 is brought into contact with the vertical wall portion 32 of the second hub member 31, an inner peripheral end of the vertical wall portion 22 of the first hub member 21 is engaged therewith.

The vertical wall portion 32 of the second hub member 31 has a plurality of bosses 35 each formed at an inner peripheral end thereof in an approximately columnar shape extending toward the driven source side. As shown in FIGS. 9 and 11, the bosses 35 are arranged in a circumferentially dispersed manner, and each of the bosses 35 is formed with a screw hole 35a opened toward the driven source side. A fastening bolt B1 is screwed into the screw hole 35a of each of the bosses 35 from the driven source side with respect to the fourth hub member 51, so that the third hub member 41 and the fourth hub member 51 are joined to a portion of the second hub member 31 on the driven source side.

As shown in FIG. 3, the third hub member 41 comprises: a vertical wall portion 42 formed in an approximately annular disc shape extending in a direction orthogonal to the axial direction of the transmission casing 11; a first cylindrical portion 43 formed in an approximately cylindrical shape extending from a radially outward end of the vertical wall portion 42 toward the driven source side; and a second cylindrical portion 44 formed in an approximately cylindrical shape extending from a radially inward end of the vertical wall portion 42 toward the driven source side. The first cylindrical portion 43 and the second cylindrical portion 44 are formed to have approximately the same axial length.

The first cylindrical portion 43 of the third hub member 41 is disposed radially inward of the cylindrical portion 23 of the first hub member 21. The first cylindrical portion 43 of the third hub member 41 has a flange 43a formed at an end thereof on the driven source side to extend radially outwardly so as to come into contact with an inner peripheral surface of the cylindrical portion 23 of the first hub member 21, thereby forming a part of the lubrication oil supply passage L1 in cooperation with the cylindrical portion 23 of the first hub member 21.

The second cylindrical portion 44 of the third hub member 41 has a drive source-side outer peripheral surface 44a, and a driven source-side outer peripheral surface 44b. The driven source-side outer peripheral surface 44b is formed such that a radial dimension thereof becomes smaller than that of the drive source-side outer peripheral surface 44a so as to form the disengagement hydraulic pressure chamber 92.

As shown in FIGS. 3, 8, and 13, the second cylindrical portion 44 of the third hub member 41 further has: a plurality of boss receiving recesses 45 each recessed from the drive source side toward the driven source side so as to be formed in an approximately rectangular shape capable of receiving therein a respective one of the bosses 35 of the second hub member 31; and a plurality of bolt insertion holes 44c each for allowing the fastening bolt B1 to be inserted therethrough.

The fourth hub member 51 is formed in an approximately annular disc shape extending in a direction orthogonal to the axial direction of the transmission casing 11, and disposed on the driven source side with respect to the third hub member 41. The fourth hub member 51 has a radially inward portion formed with a plurality of bolt insertion holes 52 each for allowing the fastening bolt B1 to be inserted therethrough.

By screwing the fastening bolt B1 into each of the screw holes 35a of the second hub member 31 from the driven source side with respect to the fourth hub member 51, as mentioned above, through a corresponding one of the bolt insertion holes 52 of the fourth hub member 51 and a corresponding one of the bolt insertion holes 44c of the third hub member 41, the third hub member 41 is joined to a portion of the second hub member 31 on the driven source side, and the fourth hub member 51 is joined to an end of the third hub member 41 on the driven source side.

The fourth hub member 51 is formed to extend radially outwardly from the driven source-side end of the second cylindrical portion 44 of the third hub member 41, and to have an outer peripheral surface fittingly engaged with the piston 80. The fourth hub member 51 has a snap ring-receiving circumferential groove 54 which is formed on the outer peripheral surface thereof at a position on the driven source side with respect to a region of the outer peripheral surface fittingly engaged with the piston 80, such that it is recessed radially inwardly to have a cross-sectionally approximately rectangular shape. A snap ring 55 formed in a cross-sectionally approximately rectangular shape is installed in the snap ring-receiving circumferential groove 54

The snap ring 55 is configured such that the diameter thereof in a non-installed state becomes smaller than that in an installed state, and formed in an approximately annular shape. Correspondingly to the snap ring 55, the piston 80 has a snap ring-receiving groove 80a which is formed on a radially middle portion thereof such that it is recessed from the driven source side toward the drive source side to have a cross-sectionally approximately L shape. The snap ring 55 is configured to hold the piston 80 at a given disengagement position when a drive source-side surface of the snap ring 55 is brought into contact with a drive source-side inner surface of the snap ring-receiving groove 80a, and a driven source-side surface of the snap ring 55 is brought into contact with a driven source-side inner surface of the snap ring-receiving circumferential groove 54.

In this manner, the snap ring 55 serving as a holding member for holding the piston 80 at the disengagement position is attached to the hub member 20, specifically to the fourth hub member 51. The snap ring 55 is disposed at a position overlapping the piston 80 in the axial direction, such that it is brought into contact with a radially middle portion of the piston 80.

In the hub member 20, each of the first hub member 21, the second hub member 31, the third hub member 41, and the fourth hub member 51 is formed from the same material, specifically an aluminum-based material.

The drum member 60 has: a cylindrical portion 61 formed in an approximately cylindrical shape extending in the axial direction of the transmission casing 11 and disposed in opposed relation to the outer peripheral surface of the cylindrical portion 23 of the first hub member 21, and a vertical wall portion 62 formed in an approximately annular disc shape extending from an end of the cylindrical portion 61 on the driven source side, radially inwardly, i.e., in a direction orthogonal to the axial direction of the transmission casing 11.

The vertical wall portion 62 of the drum member 60 is joined to the ring gear R3 as a rotary member. The cylindrical portion 61 of the drum member 60 is provided with a splined region 61a having splines formed on an inner peripheral surface thereof, and a rotary-side friction plates 72 constituting the frictional plates 70 are spline-engaged with the splined region 61a. The stationary-side friction plates 71 and the rotary-side friction plates 72 are alternately arranged in the axial direction.

The piston 80 is disposed between the hub member 20 and the drum member 60, specifically between the cylindrical portion 23 of the first hub member 21 and the cylindrical portion 61 of the drum member 60, and fittingly engaged with to the outer peripheral surfaces of the second cylindrical portion 44 of the third hub member 41 in a slidable manner. The piston 80 is prevented from dropping out toward the driven source side by the snap ring 55 for holding the piston 80 at the disengagement position.

The piston 80 is formed in an annular shape to have: a pressing portion 81 provided on an outer peripheral side of the annular shape and configured to press the friction plates 70; a hydraulic pressure chamber forming portion 82 provided on an inner peripheral side of the annular shape and configured to form the hydraulic pressure chamber 90; and a connecting portion 83 connecting the pressing portion 81 and the hydraulic pressure chamber forming portion 82, as shown in FIG. 4. The hydraulic pressure chamber forming portion 82 of the piston 80 comprises: an engagement hydraulic pressure chamber forming part 84 forming the engagement hydraulic pressure chamber 91; and a disengagement hydraulic pressure chamber forming part 85 forming the disengagement hydraulic pressure chamber 92.

The pressing portion 81 of the piston 80 is disposed on the driven source side with respect to the friction plates 70, and the hydraulic pressure chamber forming portion 82 is disposed radially inward of the friction plates 70. The connecting portion 83 extends from the driven source side with respect to the friction plates 70, radially inwardly with respect to the friction plates 70 so as to connect the pressing portion 81 and the hydraulic pressure chamber forming portion 82 together.

In the automatic transmission 10, the piston 80 comprises: a first piston member 86 having the pressing portion 81, the hydraulic pressure chamber forming portion 82, and the connecting portion 83; and a second piston member 87 joined to the first piston member 86 to partition between the engagement hydraulic pressure chamber 91 and the disengagement hydraulic pressure chamber 92.

In the first piston member 86, the snap ring-receiving groove 80a is formed on the connecting portion 83, correspondingly to the snap ring 55. As shown in FIG. 4, the first piston member 86 is provided with a fittingly-receiving portion 86a formed in an annular shape protruding toward the driven source side, and the second piston member 87 is provided with a fitting engagement portion 87a formed in an annular shape protruding toward the drive source side.

The fittingly-receiving portion 86a of the first piston member 86 and the fitting engagement portion 87a of the second piston member 87 are press-fittingly engaged together, so that the first piston member 86 and the second piston member 87 are joined together to form the piston 80. The second piston member 87 is joined to the first piston member 86 to partition between the driven source-side engagement hydraulic pressure chamber 91 and the drive source-side disengagement hydraulic pressure chamber 92.

On the driven source side with respect to the friction plates 70, the first piston member 86 extends radially inwardly and then comes into fitting engagement with the outer peripheral surface of the fourth hub member 51. Further, on the drive source side with respect to the fourth hub member 51, the first piston member 86 extends radially inwardly and then comes into fitting engagement with the outer peripheral surface 44a of the second cylindrical portion 44 of the third hub member 41. A sealing member 86b is attached to a radially inward end of the first piston member 86 to seal between the first piston member 86 and the third hub member 41.

The second piston member 87 is joined to the first piston member 86, as mentioned above, and, after extending radially inwardly from the fitting engagement portion 87a, fittingly engaged with the outer peripheral surface 44b of the second cylindrical portion 44 of the third hub member 41. The second piston member 87 extends more radially inwardly than the first piston member 86, and a sealing member 87b is attached to a radially inward end of the second piston member 87 to seal between the second piston member 87 and the third hub member 41.

Thus, the engagement hydraulic pressure chamber 91 is formed as a space defined by the first piston member 86, the second piston member 87, the third hub member 41, and the fourth hub member 51. The disengagement hydraulic pressure chamber 92 is formed as a space defined by the first piston member 86, the second piston member 87, and the third hub member 41.

As shown in FIG. 5, the biasing unit 100 is disposed inside the engagement hydraulic pressure chamber 91. The second piston member 87 forming the engagement hydraulic pressure chamber 91 is configured such that a driven source-side surface thereof receives a biasing force of the spring 101 of the biasing unit 100. The spring 101, the engagement hydraulic pressure chamber 91 and the disengagement hydraulic pressure chamber 92 are arranged radially inward of the friction plates 70 at positions radially overlapping each other.

The biasing unit 100 comprises: a plurality of the springs 101 each composed of a coil spring extending in the axial direction; and a retainer plate 102 formed in an annular shape and configured to retain drive source-side ends of the springs 101. The retainer plate 102 is provided with a plurality of spring guides 103 each of which is formed in a cylindrical shape protruding toward the driven source side and to which the springs 101 are attached, respectively to allow the springs 101 to be arranged at positions radially overlapping each other, and at circumferentially different positions.

The biasing unit 100 is attached to the hub member 20 in such a manner that the retainer plate 102 is supported by the driven source-side surface of the second piston member 87, and driven source-side ends of the springs 101 attached to the retainer plate 102 are supported by a drive source-side surface of the fourth hub member 51. The biasing unit 100 is set such that, when each of the springs 100 has a free length, the piston 80 is located at a zero-clearance position.

As above, the biasing unit 100 is configured such that the springs 101 apply a biasing force to the piston 80 in the engagement direction in a range from the disengagement position to the zero-clearance position. Then, when an engagement hydraulic pressure is supplied to the engagement hydraulic pressure chamber 91 in a situation where the piston 80 is located at the zero-clearance position, the piston 80 is moved to the engagement position where the friction palates are pressed by the piston 80 and placed in the engaged state in which they are clamped between the vertical wall portion 22 of the first hub member 21 and the piston 80 to become incapable of relative rotation.

On the other hand, when the engagement hydraulic pressure is released from the engagement hydraulic pressure chamber 91 and a disengagement hydraulic pressure is supplied to the disengagement hydraulic pressure chamber 92 in a situation where the piston 80 is located at the engagement position, the piston 80 is biased in the disengagement direction, so that the piston 80 is moved to the zero-clearance position. The piston 80 is further biased in in the disengagement direction against the springs 101, and moved to the disengagement position.

As shown in FIG. 3, the connecting portion 83 of the piston 80, specifically a bulging portion 83a bulging toward the driven source side with respect to the pressing portion 81, is formed with a first hub member-receiving cutout 83b cut out correspondingly to the splined region 25 of the cylindrical portion 23 of the first hub member 21. A driven source-side end of the splined region 25 of the cylindrical portion 23 of the first hub member 21 is fittingly engaged in the first hub member-receiving cutout 83b of the piston 80. Thus, the first hub member 21 and the piston 80 are arranged such that they overlap each other in the axial direction.

Figure 14:
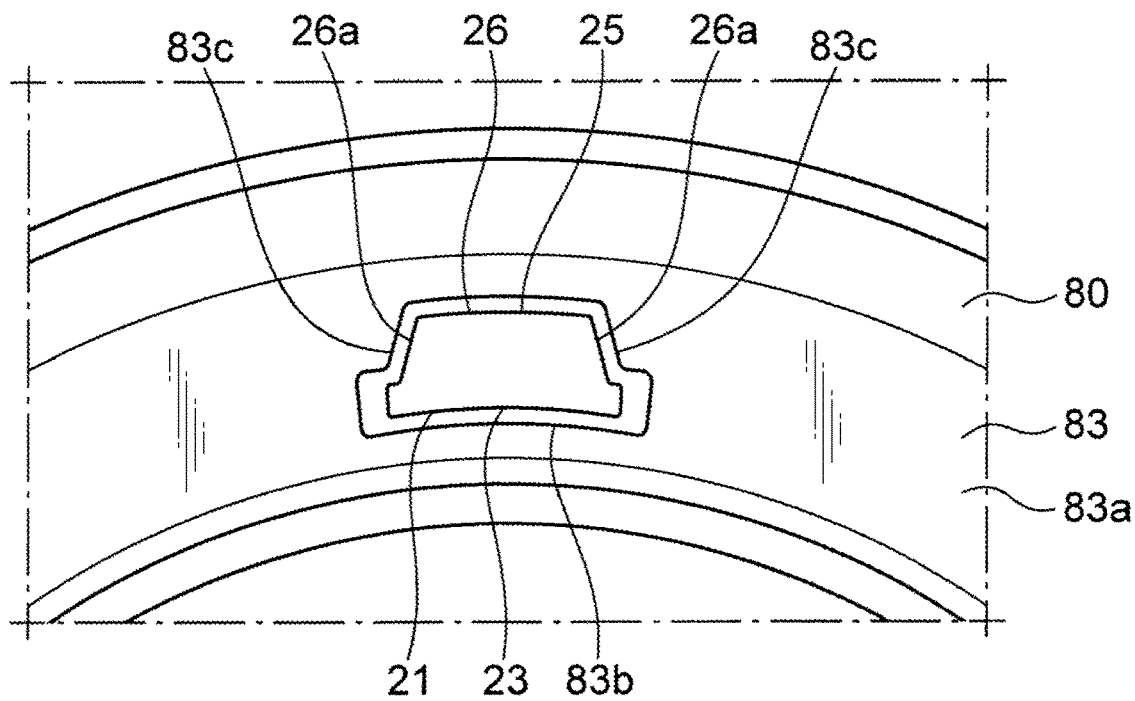
FIG. 14 is a front view showing main parts of the hub member and the piston of the brake in this embodiment.
Figure 16:
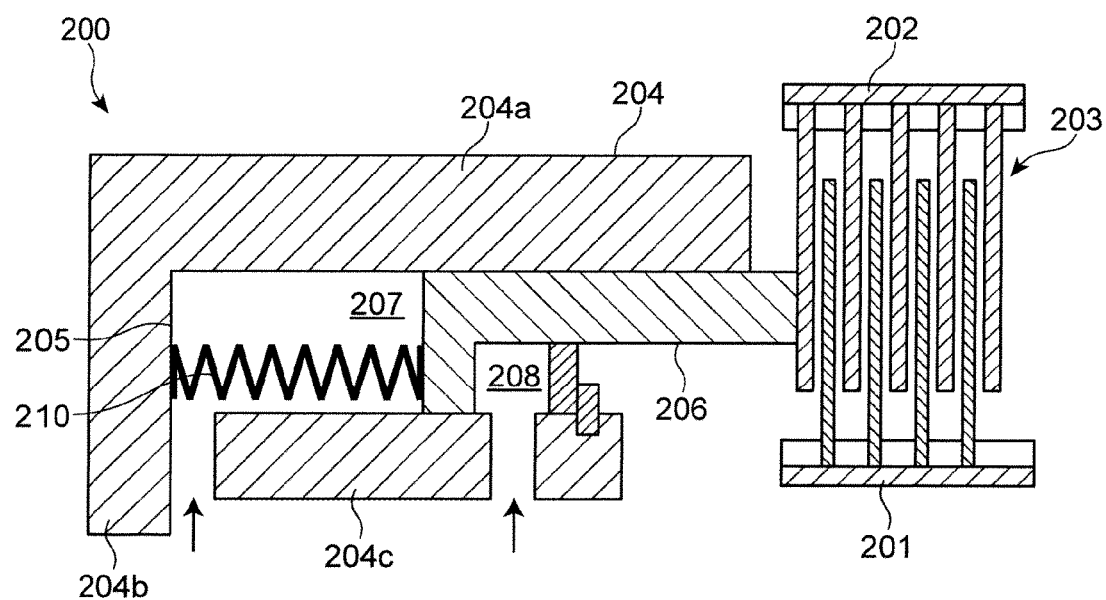
FIG. 16 is a sectional view showing a brake of a conventional automatic transmission.

FIG. 14 is a front view showing main parts of the hub member and the piston of the brake in this embodiment. As shown in FIG. 14, the first hub member-receiving cutout 83b is formed correspondingly to the first tooth 26 of the splined region 25 of the first hub member 21. The first hub member-receiving cutout 83b is cut out more largely than a cross-sectional shape of the first tooth 26 of the splined region 25 of the first hub member 21, and formed to have opposed side surfaces 83c each disposed along a respective one of opposed side surfaces 26a of the first tooth 26. As shown in FIG. 7, the first hub member-receiving cutout 83b is formed in the piston 80 plurally, specifically, by a number of three, correspondingly to the three first teeth 26, wherein the three first hub member-receiving cutouts 83b are disposed at circumferentially approximately even intervals.

The first hub member 21 is configured such that, when the piston 80 is rotated in the circumferential direction, one of the side surfaces 83c of each of the first hub member-receiving cutouts 83b is brought into contact with a corresponding one of the side surfaces 26a of each of the first teeth 26 of the first hub member 21 to restrain the piston 80 from being rotated by a given amount or more, e.g., by a rotational angle of 1 degree or more.

The side surfaces 83c of each of the first hub member-receiving cutouts 83b function as a restraint part disposed along the side surfaces 26a of each of the first teeth 26 of the splined region 25 of the hub member 20. That is, the hub member 20 functions as a piston rotation restraint member for restraining the piston 80 from being rotated by a given amount or more in the circumferential direction.

As shown in FIG. 11, the second hub member 31 has two bolt insertion holes 32b formed in the vicinity of the engagement oil supply passage L2 and the disengagement oil supply passage L3. As shown in FIG. 13, the third hub member 41 has two screw holes 41a formed correspondingly to the bolt insertion holes 32b of the second hub member 31.

As shown in FIG. 12, the third hub member 41 is joined to the second hub member 31 by inserting the fastening bolt B2 into each of the bolt insertion holes 32b of the second hub member 31 from a drive source-side surface of the second hub member 31 and screwing the fastening bolt B2 into each of the screw holes 41a of the third hub member 41. As shown in FIG. 13, a seal member 47 is attached to a drive source-side surface of the third hub member 41 to seal around each of the engagement oil supply passage L2 and the disengagement oil supply passage L3 between the second hub member 31 and the third hub member 41.

Next, the oil supply passages for supplying hydraulic oil to the brake BR2 will be described.

The lubrication oil supply passage L1 for supplying the lubrication hydraulic oil to the friction plates 70 is formed in the first hub member 21, the second hub member 31, and the third hub member 41. The engagement oil supply passage L2 for supplying the engagement hydraulic oil to the engagement hydraulic pressure chamber 91 is formed in the second hub member 31, the third hub member 41 and the fourth hub member 51. The disengagement oil supply passage L3 for supplying the disengagement hydraulic oil to the disengagement hydraulic pressure chamber 92 is formed in the second hub member 31 and the third hub member 41.

As shown in FIGS. 3 and 4, the lubrication oil supply passage L1 comprises: a radial oil passage 131 provided in the vertical wall portion 32 of the second hub member 31 to extend in the radial direction; a circumferential oil passage 132 connected to the radial oil passage 131 and provided between the cylindrical portion 23 of the first hub member 21 and the first cylindrical portion 43 of the third hub member 41 to extend annularly in the circumferential direction; a supply port 133 provided in the cylindrical portion 23 of the first hub member 21 such that it is connected to the circumferential oil passage 132 and opened to the outer peripheral surface of the cylindrical portion 23 of the first hub member 21 to supply the lubrication hydraulic oil to the friction plates 70.

As shown in FIG. 10, the supply port 133 is provided plurally in the cylindrical portion 23 of the first hub member 21, wherein the plurality of supply ports 133 are arranged side-by-side in the axial direction. The supply port 133 is preferably opened to a tooth top of the tooth (26, 27) of the splined region 25 of the cylindrical portion 23 of the first hub member 21. Alternatively, the supply port 133 may be opened to a tooth bottom of the tooth (26, 27) of the splined region 25.

The second hub member 31 is formed such that the lubrication oil supply passage L1 is connected to the valve body 5. The radial oil passage 131 of the second hub member 31 is provided in the vertical wall portion 32 of the second hub member 31, and opened to a lower surface of the valve body connection portion 34 so as to be connected to the valve body 5. The valve body 5 is configured to supply the lubrication hydraulic oil to the friction plates 70 via the lubrication oil supply passage L1.

As shown in FIG. 5, the engagement oil supply passage L2 comprises: a radial oil passage 111 provided in the vertical wall portion 32 of the second hub member 31 to extend in the radial direction; a radial oil passage 112 provided in the fourth hub member 51 to extend in the radial direction; and an axial oil passage 113 provided in the second cylindrical portion 44 of the third hub member 41 to extend in the axial direction. The axial oil passage 113 of the third hub member 41 is connected to the radial oil passage 111 of the second hub member 31. Further, the axial oil passage 113 of the third hub member 41 is opened and connected to the engagement hydraulic pressure chamber 91 via the radial oil passage 112 of the fourth hub member 51. A radially inward end of the radial oil passage 111 of the second hub member 31 is formed by being covered with the third hub member 41, and the radial oil passage 112 of the fourth hub member 51 is formed by being covered with the third hub member 41.

The second hub member 31 is formed such that the engagement oil supply passage L2 is connected to the valve body 5. The radial oil passage 111 of the second hub member 31 is provided in the vertical wall portion 32 of the second hub member 31, and opened to the lower surface of the valve body connection portion 34 so as to be connected to the valve body 5. The valve body 5 is configured to supply the engagement hydraulic oil to the engagement hydraulic pressure chamber 91 via the engagement oil supply passage L2, thereby supplying a given engagement hydraulic pressure.

As shown in FIG. 6, the disengagement oil supply passage L3 comprises: a radial oil passage 121 provided in the vertical wall portion 32 of the second hub member 31 to extend in the radial direction; and an axial oil passage 122 provided in the second cylindrical portion 44 of the third hub member 41 to extend in the axial direction. The axial oil passage 122 of the third hub member 41 is connected to the radial oil passage 121 of the second hub member 31. Further, the axial oil passage 122 of the third hub member 41 is opened and connected to the disengagement hydraulic pressure chamber 92. A radially inward end of the radial oil passage 121 of the second hub member 31 is formed by being covered with the third hub member 41.

The second hub member 31 is formed such that the disengagement oil supply passage L3 is connected to the valve body 5. The radial oil passage 121 of the second hub member 31 is provided in the vertical wall portion 32 of the second hub member 31, and opened to the lower surface of the valve body connection portion 34 so as to be connected to the valve body 5. The valve body 5 is configured to supply the disengagement hydraulic oil to the disengagement hydraulic pressure chamber 92 via the disengagement oil supply passage L3, thereby supplying a given engagement hydraulic pressure.

As shown in FIG. 11, in the automatic transmission 10, the radial oil passages 111, 121, 131 constituting, respectively, the engagement oil supply passage L2, the disengagement oil supply passage L3, and the lubrication oil supply passage L1 are arranged side-by-side in the circumferential direction. As shown in FIG. 12, the circumferential oil passage 132 constituting the lubrication oil supply passage L1 is connected to the radial oil passage 131 and extends annularly in the circumferential direction.

Next, the operation of the brake BR2 configured as above will be described.

FIGS. 15A to 15C are sectional views showing the brake in this embodiment, respectively, in the disengaged state, in the zero-clearance state and in the engaged state. In FIGS. 15A to 15C, the main part of the brake BR2 as shown in FIG. 3 is illustrated.

In FIG. 15A, the engagement hydraulic pressure is released from the engagement hydraulic pressure chamber 91, and he disengagement hydraulic pressure is supplied to the disengagement hydraulic pressure chamber 92, so that the spring 101 is compressed through the piston 80, and moved in the disengagement direction, i.e., toward the driven source side, whereby the piston 80 is set at the disengagement position where the friction plates 70 are in the disengaged state. That is, FIG. 15A shows the disengaged state of the brake BR2

In operation of engaging the brake BR2 from the disengaged state as shown in FIG. 15A, the disengagement hydraulic pressure is released from the disengagement hydraulic pressure chamber 92. Thus, as shown in FIG. 15B, according to a biasing force received from the spring 101, the piston 80 is moved in the engagement direction to a position where the piston 80 has a free length, so that the piston 80 is set at the zero-clearance position where the piston 80 is in state in which it is exactly or approximately in contact with the friction plates 70 without pressing the friction plates 70, and thus the brake BR2 becomes the zero-clearance state.

Then, the engagement hydraulic pressure is applied to the engagement hydraulic pressure chamber 91 from the zero-clearance state as shown in FIG. 15B. Thus, as shown in FIG. 15C, according to the engagement hydraulic pressure supplied to the engagement hydraulic pressure chamber 91, the piston 80 is biased and moved in the engagement direction to press the friction plates 70 and finally moved to the engagement position where the friction plates 70 becomes incapable of relative rotation, and thus the brake BR2 becomes the engaged state.

On the other hand, in operation of disengaging the brake BR2 from the engaged state as shown in FIG. 15C, the engagement hydraulic pressure is released from the engagement hydraulic pressure chamber 91, and the disengagement hydraulic pressure is supplied to the disengagement hydraulic pressure chamber 92, so that, according to disengagement hydraulic pressure supplied to the disengagement hydraulic pressure chamber 92, the piston 80 is biased and moved in the disengagement direction, i.e., toward the driven source side, whereby the brake BR2 becomes the engaged state as shown in FIG. 15A after the zero-clearance state as shown in FIG. 15B.

In the brake BR2, it is possible to accurately move, by the spring 101, the piston 80 from the disengagement position to the zero-clearance position. Here, when the piston 80 is moved in the engagement direction by releasing the disengagement hydraulic pressure from the disengagement hydraulic pressure chamber 92 in the disengaged state as shown in FIG. 15A, hydraulic oil may be pre-charged to the engagement hydraulic pressure chamber 91 so as to allow the piston 80 to be quickly moved.

During starting of a vehicle, the brake BR2 is slip-controlled, as mentioned above. Specifically, in the operation of engaging the brake BR2, a hydraulic pressure lower than the engagement hydraulic pressure is supplied to the engagement hydraulic pressure chamber 91 to set the friction plates 70 to a slip state, and then the engagement hydraulic pressure is supplied to the engagement hydraulic pressure chamber 91 to engage the friction plates 70. On the other hand, in the operation of disengaging the brake BR2, a hydraulic pressure lower than the disengagement hydraulic pressure is supplied to the disengagement hydraulic pressure chamber 92 to set the friction plates 70 to a slip state, and then the disengagement hydraulic pressure is supplied to the disengagement hydraulic pressure chamber 92 to disengage the friction plates 70.

During engagement and disengagement of the brake BR2, the lubrication hydraulic oil is supplied to the friction plates 70 via the lubrication oil supply passage L1, and, when the brake BR2 is slip-controlled, the lubrication hydraulic oil is supplied to the friction plates 70 via the lubrication oil supply passage L1.

As above, in the automatic transmission 10 according to the above embodiment equipped with the brake BR2 in which the plurality of friction plates 70 are arranged between the hub member 20 and the drum member 60, the biasing member 101 biasing the piston 80, the engagement hydraulic pressure chamber 91, and the disengagement hydraulic pressure chamber 92 are arranged radially inward of the friction plates 70 at positions radially overlapping each other.

This makes it possible to, as compared with a case where the biasing member 101, the engagement hydraulic pressure chamber 91, and the disengagement hydraulic pressure chamber 92 are arranged on one side in the axial direction with respect to the friction plates 79, arrange them in an axially compact manner, and as compared with a case where the biasing member 101, the engagement hydraulic pressure chamber 91, and the disengagement hydraulic pressure chamber 92 are arranged without radially overlapping each other, arrange them in a radially compact manner.

Further, the hub member 20 comprises: the first hub member 21 comprising the cylindrical portion 23 having the splined region 25 with which the friction plates 70 are spline-engaged, wherein the first hub member 21 is spline-engaged with the transmission casing 11; and the second hub member 31 formed with a part of the lubrication oil supply passage L1, wherein the second hub member 31 is fittingly engaged with the transmission casing 11 such that it is connected to the valve body 5.

In this way, the first hub member 21 is spline-engaged with the transmission casing 11, so that it is possible to suppress a situation where, during engagement of the brake BR2, the first hub member 21 is rotated in the circumferential direction of the transmission casing 11 by a force input from the friction plates 70 through the splined region 25, i.e., to prevent rotation of the hub member 20.

The second hub member 31 is fittingly engaged with the transmission casing 11, so that it is possible to fix the second hub member 31 to the transmission casing 11, and allow a connected portion between the second hub member 31 and the valve body 5 to become free of a backlash in the circumferential direction of the transmission casing 11, thereby efficiently supplying the lubrication hydraulic oil from the valve body 5 to the first part of the lubrication oil supply passage L1 of the second hub member 31.

Therefore, in the automatic transmission 10 equipped with the brake BR2 which comprises the plurality of friction plates 70 arranged between the hub member 20 and the drum member 60, the biasing member 101 biasing the piston 80, the engagement hydraulic pressure chamber 91 and the disengagement hydraulic pressure chamber 92, it becomes possible to realize a compact arrangement while preventing rotation of the hub member 20 with which the friction plates 70 are spline-engaged, and efficiently supplying the lubrication hydraulic oil from the valve body 5 to the friction plates 70.

In the above embodiment, the hub member 20 comprises the third hub member 41 disposed radially inward of the first hub member 21 and joined to the second hub member 31, wherein the third hub member 41 has a cylindrical portion 43 provided radially inward of the cylindrical portion 23 of the first hub member 21 to form a second part of the lubrication oil supply passage L1 in cooperation with the cylindrical portion 23 of the first hub member 21, wherein the cylindrical portion 23 of the first hub member 21 is provided with the supply port 133.

Therefore, the lubrication hydraulic oil can be supplied to the friction plates 70 via a part of the lubrication oil supply passage L1 of the second hub member 31 and a part of the lubrication oil supply passage L1 formed between the cylindrical portion 23 of the first hub member 21 and the cylindrical portion 43 of the third hub member 41 and through the supply port 133 of the cylindrical portion 23 of the first hub member 21, so that it is possible to efficiently supply the lubrication hydraulic oil to the friction plates 70.

In the above embodiment, the first hub member 21, the second hub member 31 and the third hub member 41 are formed from a same material. According to this feature, it is possible to approximately equalize a change in dimension of each of the first hub member 21, the second hub member 31, and the third hub member 41 due to thermal expansion, as compared with a case where the first hub member 21, the second hub member 31, and the third hub member 41 are not formed from the same material, thereby efficiently supplying the lubrication hydraulic oil to the friction plates 70.

In the above embodiment, the biasing member 101 is configured to apply a biasing force to the piston 80 in the engagement direction in a range from the disengagement position to the zero-clearance position. According to this feature, it is possible to accurately move, by the biasing member 101, the piston 80 from the disengagement position to the zero-clearance position.

In the above embodiment, the piston 80 comprises: the first piston member 86 having the pressing portion 81, the hydraulic pressure chamber forming portion 82 and the disengagement hydraulic pressure chamber 92, and the connecting portion 83; and the second piston member 87 joined to the first piston member 86 to partition between the engagement hydraulic pressure chamber 91 and the disengagement hydraulic pressure chamber 92. According to this feature, even in a situation where it is difficult to form, by a single member, the piston 80 having the pressing portion 81, the hydraulic pressure chamber forming portion 82 and the connecting portion 83 and partitioning between the engagement hydraulic pressure chamber 91 and the disengagement hydraulic pressure chamber 92, such a piston 80 having the pressing portion 81, the hydraulic pressure chamber forming portion 82 and the connecting portion 83 and partitioning between the engagement hydraulic pressure chamber 91 and the disengagement hydraulic pressure chamber 92 can be relatively easily formed by joining the first piston member 86 and the second piston member 87 together.

It should be noted that the present invention is not limited to the above embodiment, but various changes and modifications may be made therein without departing from the spirit and scope of the invention as set forth in appended claims.

INDUSTRIAL APPLICABILITY

As mentioned above, the present invention can provide an automatic transmission equipped with a brake which comprises a plurality of friction plates arranged between a hub member and a drum member, a biasing member biasing a piston, an engagement hydraulic pressure chamber and a disengagement hydraulic pressure chamber, wherein the automatic transmission is capable of realizing a compact arrangement while preventing rotation of the hub member with which the friction plates are spline-engaged, and efficiently supplying lubrication hydraulic oil from a valve body to the friction plates. Thus, the present invention can be suitably used in the technical field of production of this type of automatic transmission or vehicles equipped therewith.

LIST OF REFERENCE CHARACTERS

10: automatic transmission
11: transmission casing
20: hub member
21: first hub member
31: second hub member
41: third hub member
51: fourth hub member
60: drum member
70: frictional plate
80: piston
90: hydraulic pressure chamber
91: engagement hydraulic pressure chamber
92: disengagement hydraulic pressure chamber
101: spring
BR2: second brake
L1: lubrication oil supply passage
L2: engagement oil supply passage
L3: disengagement oil supply passage
R3: ring gear

The invention claimed is:

1. An automatic transmission equipped with a brake, comprising:
    a hub member joined to a transmission casing;
    a drum member joined to a given rotary member;
    a plurality of friction plates arranged between the hub member and the drum member;
    a piston for engaging the plurality of friction plates;
    a biasing member biasing the piston in an engagement direction;
    an engagement hydraulic pressure chamber to which hydraulic oil for biasing the piston in the engagement direction is supplied; and a disengagement hydraulic pressure chamber to which hydraulic oil for biasing the piston in a disengagement direction is supplied, wherein the biasing member, the engagement hydraulic pressure chamber, and the disengagement hydraulic pressure chamber are arranged radially inward of the plurality of friction plates at positions radially overlapping each other, and wherein the hub member comprises:
- a first hub member comprising a cylindrical portion having a splined region with which the friction plates are spline-engaged, wherein the first hub member is spline-engaged with the transmission casing; and
- a second hub member disposed on one side in an axial direction with respect to the first hub member, and formed with a part of a lubrication oil supply passage for supplying lubrication hydraulic oil to the friction plates, wherein the second hub member is fittingly engaged with the transmission casing such that it is connected to a valve body disposed beneath the transmission casing.

2. The automatic transmission as recited in claim 1, wherein the hub member further comprises a third hub member disposed radially inward of the first hub member and joined to a portion of the second hub member on the other side in the axial direction, wherein the third hub member has a cylindrical portion provided radially inward of the cylindrical portion of the first hub member to form a part of the lubrication oil supply passage in cooperation with the cylindrical portion of the first hub member, wherein the cylindrical portion of the first hub member is provided with a supply port for supplying the lubrication hydraulic oil to the friction plates.

3. The automatic transmission as recited in claim 2, wherein the first hub member, the second hub member, and the third hub member are formed from a same material.

4. The automatic transmission as recited in claim 1, wherein the biasing member is configured to apply a biasing force to the piston in the engagement direction in a range from a disengagement position to a zero-clearance position.

5. The automatic transmission as recited in claim 1, wherein the piston comprises:
- a first piston member having:
  - a pressing portion for pressing the friction plates,
  - a hydraulic pressure chamber forming portion forming the engagement hydraulic pressure chamber and the disengagement hydraulic pressure chamber, and
  - a connecting portion connecting the pressing portion and the hydraulic pressure chamber forming portion; and
- a second piston member joined to the first piston member to partition between the engagement hydraulic pressure chamber and the disengagement hydraulic pressure chamber.

* * * * *